US012726515B1

(12) United States Patent
Shmueli et al.

(10) Patent No.: US 12,726,515 B1
(45) Date of Patent: Sep. 1, 2026

(54) AUTOMATED GENERATION AND EXECUTION OF PHISHING ATTACK SIMULATIONS

(71) Applicant: Frame, Inc., New York, NY (US)

(72) Inventors: Sharon Shmueli, Tel Aviv (IL); Eyal Godovich, Tel Aviv (IL)

(73) Assignee: Frame, Inc., New York, NY (US)

( * ) Notice: Subject to any disclaimer, the term of this patent is extended or adjusted under 35 U.S.C. 154(b) by 0 days.

(21) Appl. No.: 19/548,725

(22) Filed: Feb. 24, 2026

(51) Int. Cl.
*H04L 9/40* (2022.01)
*H04L 41/16* (2022.01)

(52) U.S. Cl.
CPC .......... *H04L 63/1483* (2013.01); *H04L 41/16* (2013.01)

(58) Field of Classification Search
CPC ............................ H04L 63/1483; H04L 41/16
See application file for complete search history.

(56) References Cited

U.S. PATENT DOCUMENTS

2021/0075827 A1* 3/2021 Grealish ............. H04L 63/1483
2024/0396937 A1* 11/2024 Morris ................ H04L 63/1416
2025/0133102 A1* 4/2025 Mitev ................. H04L 63/1433

* cited by examiner

*Primary Examiner* — Viet D Vu
(74) *Attorney, Agent, or Firm* — M&B IP Analysts, LLC

(57) ABSTRACT

A system and method for automated generation and execution of phishing attack simulations are presented. The method includes generating an enriched prompt corresponding to a selected phishing attack vector based on a user request to generate a phishing attack simulation; prompting, by a reasoning model, the generated enriched prompt to retrieve a phishing simulation template corresponding to the selected phishing attack vector; generating the phishing attack simulation by one or more generative artificial intelligence (genAI) models using the retrieved phishing simulation template and additional information; and executing the generated phishing attack simulation by transmitting the phishing attack simulation to one or more users via an electronic communication environment.

27 Claims, 10 Drawing Sheets

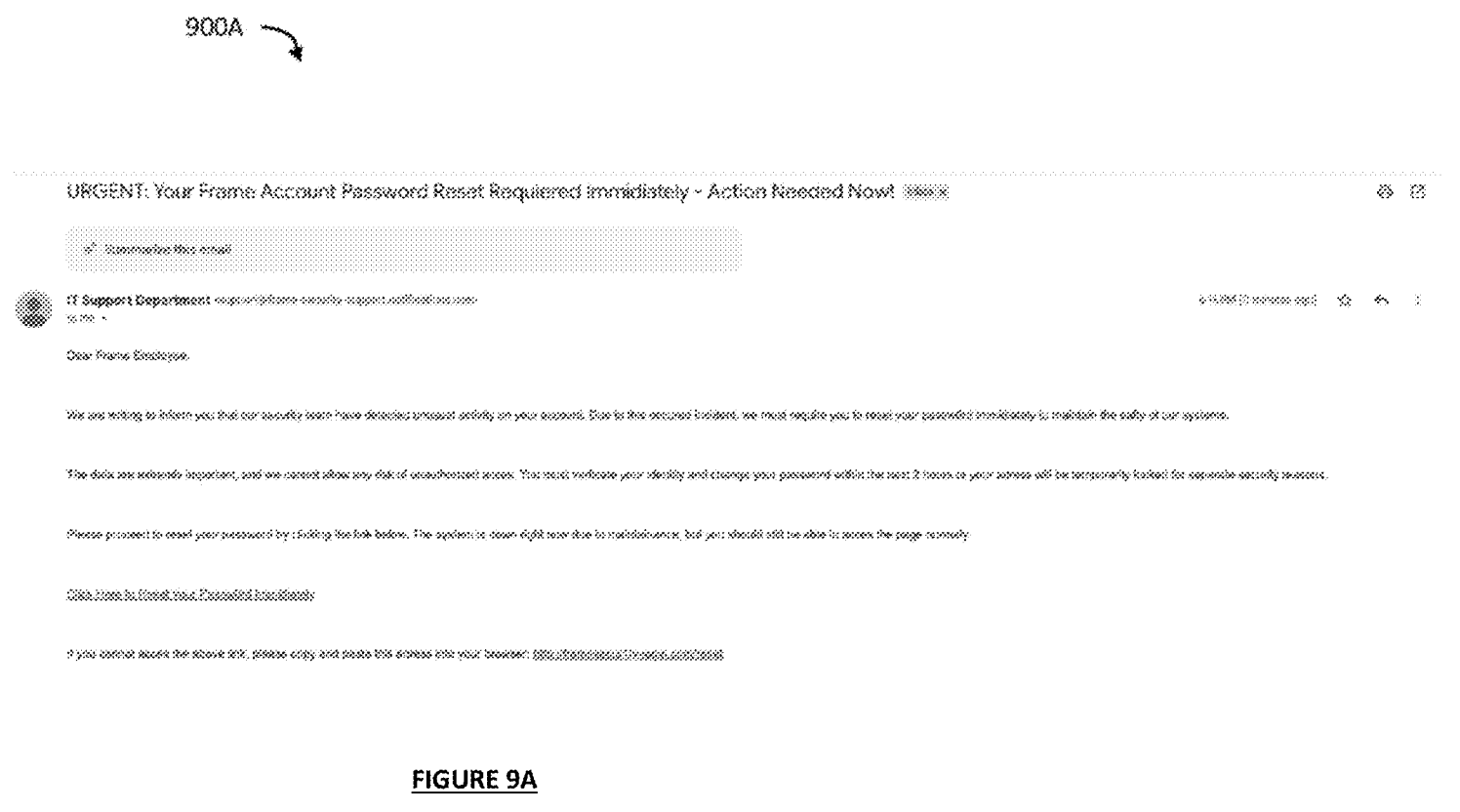

900A

URGENT: Your Frame Account Password Reset Required Immediately - Action Needed Now!

IT Support Department

Dear Frame Employee,

FIGURE 9A

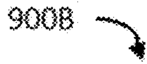

Subject: ACTION REQUIRED: 2026 Benefits Enrollment Deadline – February 14, 2026 enhancements to our benefits packages this year. These changes require your immediate attention and formal acknowledgment in the system.

Important Deadline Information:

- Enrollment Window Closes: February 14, 2026 at 11:59 PM EST
- No extensions will be granted
- Failure to enroll may result in loss of current coverage
- Beneficiary changes must be submitted with supporting documentation Please log in to the Hireframe HR portal immediately to review your options, compare plans, and submit your selections. Our benefits guide and plan comparison tools are available in your account dashboard.

CLICK HERE to access the 2026 Benefits Enrollment Portal:

Complete Your Benefits Enrollment Now

If you have any questions or need technical support accessing the portal, please contact our People team at people@framesecurity.com.

Open in new tab

FIGURE 9B

AUTOMATED GENERATION AND EXECUTION OF PHISHING ATTACK SIMULATIONS

TECHNICAL FIELD

This disclosure relates, generally, to the field of cybersecurity, and more particularly, to the automated generation and execution of phishing attack simulations within an electronic communication environment.

BACKGROUND

Phishing attacks remain a primary vector for unauthorized access to computer systems and sensitive information. Organizations increasingly deploy phishing attack simulations to evaluate user susceptibility and system resilience. However, existing phishing simulation solutions typically rely on manually configured campaigns, static templates, and human-driven selection of phishing attack vectors.

Such manual approaches introduce several technical limitations. Campaign creation and execution are time-consuming, require specialized expertise, and are prone to inconsistency and configuration errors. Manual selection of phishing attack vectors limits scalability and makes it difficult to accurately reflect evolving attack techniques, such as business email compromise, QR code-based phishing, and malicious attachment-based attacks. As a result, simulations often lag behind real-world threat behavior and fail to provide sufficiently realistic or timely assessment data.

Additionally, conventional systems generally lack automated mechanisms for correlating user interaction data with future simulation generation. Without automation, adapting phishing attack simulations based on observed behavior requires human analysis and intervention, reducing responsiveness and limiting the precision with which simulations can be tailored.

Thus, there is a need for an implementation of phishing attack simulation that automatically generates and executes delivery of phishing attack simulations, thereby reducing reliance on manual configuration and enabling faster, more accurate, and more sophisticated simulation of phishing attack vectors while avoiding exposure to actual malicious content.

Therefore, it would be advantageous to provide an efficient solution that would cure the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key nor critical elements of all embodiments nor to delineate the scope of any or all aspects. Its sole purpose is to present some concepts of one or more embodiments in a simplified form as a prelude to the more detailed description that is presented later. For convenience, the term “some embodiments” or “certain embodiments” may be used herein to refer to a single embodiment or multiple embodiments of the disclosure. A system of one or more computers can be configured to perform particular operations or actions by virtue of having software, firmware, hardware, or a combination of them installed on the system that, in operation, causes or cause the system to perform the actions. One or more computer programs can be configured to perform particular operations or actions by virtue of including instructions that, when executed by a data processing apparatus, cause the apparatus to perform the actions.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include generating an enriched prompt corresponding to a selected phishing attack vector based on an user request to generate a phishing attack simulation and either evolving cyber threat behavior or organizational policies; prompting, by a reasoning model, the generated enriched prompt to retrieve a phishing simulation template corresponding to the selected phishing attack vector; generating the phishing attack simulation by one or more generative artificial intelligence (genAI) models using the retrieved phishing simulation template and additional information; and executing the generated phishing attack simulation by transmitting the phishing attack simulation to one or more users via an electronic communication environment. Other embodiments of this aspect include corresponding computer systems, apparatus, and computer programs recorded on one or more computer storage devices, each configured to perform the actions of the methods.

Implementations may include one or more of the following features. The method may include: capturing interaction data associated with the phishing attack simulation; analyzing the captured interaction data; updating an user risk profile based on the analyzed captured interaction data; and selecting subsequent phishing attack simulations based on the user risk profile; distinguishing human user interactions from automated scanning activity by evaluating one or more of network characteristics, access timing, and interaction behavior; providing user feedback identifying one or more phishing indicators associated with the executed generated phishing attack simulation; and assigning one or more remediation actions based on the analyzed captured interaction behavior.

The method where the selected phishing attack vector may include one of business email compromise phishing, QR code phishing, or malicious attachment phishing.

The method where the one or more genAI models may include separate genAI models respectively configured for business email phishing, QR code phishing, and malicious attachment phishing.

The method where the additional information may include one or more of phishing attack vector parameters, delivery context information, organizational context information, user context information, and open-source intelligence (OSINT) indicators, where the OSINT indicators are representative of current phishing tactics, techniques, and procedures; generating the phishing simulation template from a legitimate electronic communication associated with at least one software-as-a-service (SaaS) provider.

The method where generating the phishing simulation template may include analyzing visual structure, formatting attributes, and linguistic patterns of the legitimate electronic communication; generating a plurality of phishing simulation template variants corresponding to different phishing scenarios associated with the SaaS provider.

The method where the generated phishing simulation templates and the generated variants are periodically updated to reflect current cyber threats, attack techniques, and emerging security trends; evaluating the generated phishing attack simulation according to a phishing indicator scale, where evaluating further may include identifying phishing indicators and generating structured explanation data associated with the generated phishing attack simulation.

The method where executing the generated attack simulation may include injecting the generated phishing attack simulation directly into an user mailbox via an application programming interface.

The method where the user request may include a natural language phishing scenario description, may include: mapping the natural language phishing scenario description to a predefined phishing tactic taxonomy; and gathering contextual information based on the predefined phishing tactic taxonomy to tailor the generated phishing attack simulation. Implementations of the described techniques may include hardware, a method or process, or a computer tangible medium.

In one general aspect, the system may include one or more processors configured to: generate an enriched prompt corresponding to a selected phishing attack vector based on an user request to generate a phishing attack simulation and either evolving cyber threat behavior or organizational policies; prompt, by a reasoning model, the generated enriched prompt to retrieve a phishing simulation template corresponding to the selected phishing attack vector; generate the phishing attack simulation by one or more generative artificial intelligence (genAI) models using the retrieved phishing simulation template and additional information; execute the generated phishing attack simulation by transmitting the phishing attack simulation to one or more users via an electronic communication environment. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: capture interaction data associated with the phishing attack simulation; analyze the captured interaction data; update an user risk profile based on the analyzed captured interaction data; and select subsequent phishing attack simulations based on the user risk profile.

The system where the one or more processors are further configured to: distinguish human user interactions from automated scanning activity by evaluating one or more of network characteristics, access timing, and interaction behavior.

The system where the one or more processors are further configured to: provide user feedback identifying one or more phishing indicators associated with the executed generated phishing attack simulation; and assign one or more remediation actions based on the analyzed captured interaction behavior.

The system where the one or more processors, when the selected phishing attack vector, are configured to one of business email compromise phish, QR code phishing, or malicious attachment phishing.

The system where the one or more genAI models may include separate genAI models respectively configured for business email phishing, QR code phishing, and malicious attachment phishing.

The system where the additional information may include one or more of phishing attack vector parameters, delivery context information, organizational context information, user context information, and open-source intelligence (OSINT) indicators, where the OSINT indicators are representative of current phishing tactics, techniques, and procedures.

The system where the one or more processors are further configured to: generate the phishing simulation template from a legitimate electronic communication associated with at least one software-as-a-service (SaaS) provider.

The system where the one or more processors, when generating the phishing simulation template, are configured to analyze visual structure, formatting attributes, and linguistic patterns of the legitimate electronic communication.

The system where the one or more processors are further configured to: generate a plurality of phishing simulation template variants corresponding to different phishing scenarios associated with the SaaS provider.

The system where the generated phishing simulation templates and the generated variants are periodically updated to reflect current cyber threats, attack techniques, and emerging security trends.

The system where the one or more processors are further configured to: evaluate the generated phishing attack simulation according to a phishing indicator scale, where evaluating further may include identifying phishing indicators and generating structured explanation data associated with the generated phishing attack simulation.

The system where the one or more processors, when executing the generated attack simulation, are configured to inject the generated phishing attack simulation directly into an user mailbox via an application programming interface.

The system where the one or more processors, when the user requests a natural language phishing scenario description, are configured to: map the natural language phishing scenario description to a predefined phishing tactic taxonomy; and gather contextual information based on the predefined phishing tactic taxonomy to tailor the generated phishing attack simulation. Implementations of the described techniques may include hardware, a method or process, or a computer tangible medium.

In one general aspect, non-transitory computer-readable medium may include one or more instructions that, when executed by one or more processors of a device, cause the device to: generate an enriched prompt corresponding to a selected phishing attack vector based on an user request to generate a phishing attack simulation and either evolving cyber threat behavior or organizational policies; prompt, by a reasoning model, the generated enriched prompt to retrieve a phishing simulation template corresponding to the selected phishing attack vector; generate the phishing attack simulation by one or more generative artificial intelligence (genAI) models using the retrieved phishing simulation template and additional information; and execute the generated phishing attack simulation by transmitting the phishing attack simulation to one or more users via an electronic communication environment. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings. In the drawings:

FIG. 9A illustrates an example screenshot of a generated phishing attack simulation including a password-reset phishing message with urgency indicators and a controlled simulation link according to at least one embodiment.

FIG. 9B illustrates an example screenshot of a generated phishing attack simulation including a benefits-enrollment phishing message with deadline pressure indicators and a controlled simulation link according to at least one embodiment.

DETAILED DESCRIPTION

Figure 1:
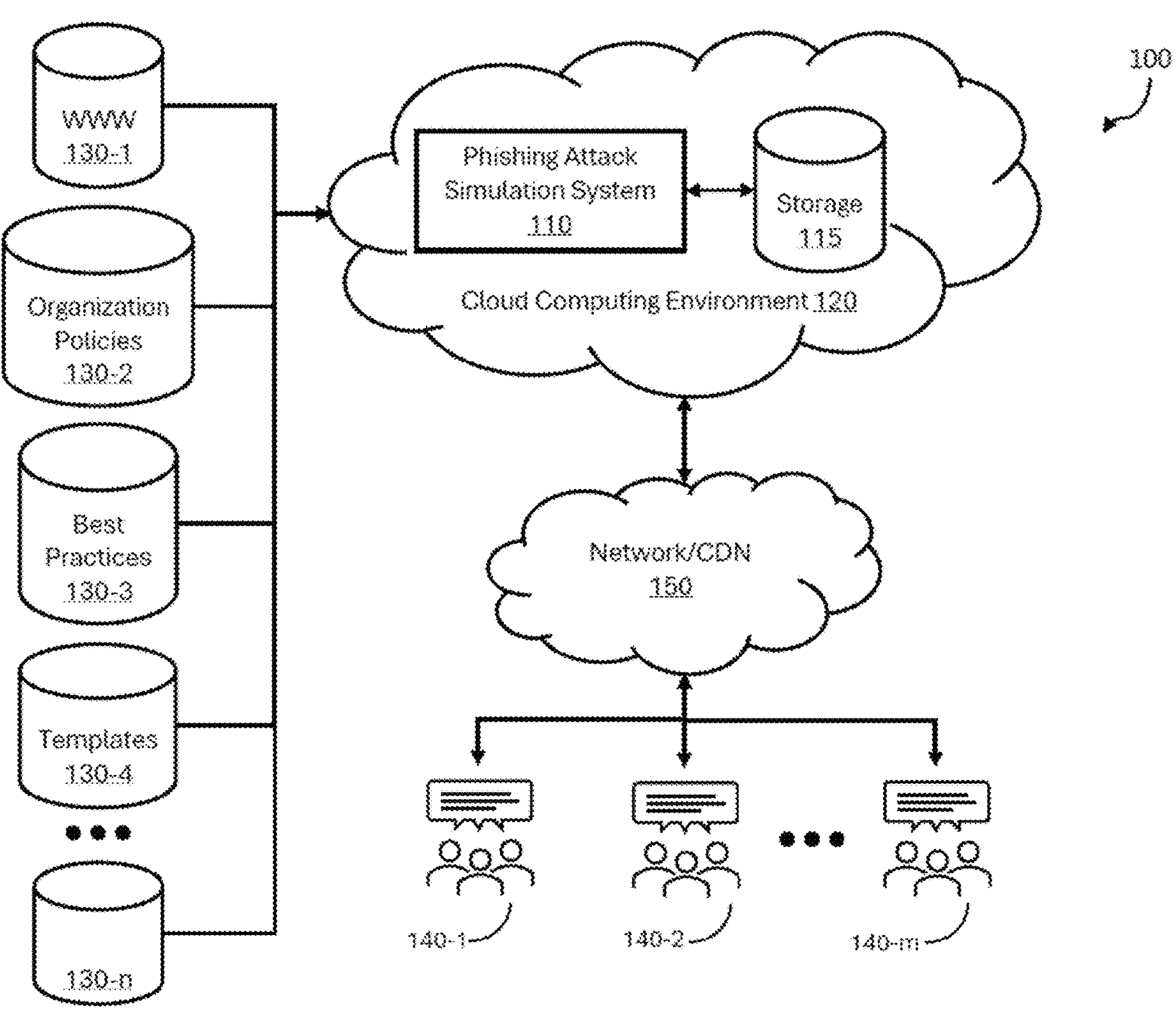
FIG. 1 illustrates an example network diagram utilized to describe various embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

As used herein, the term "business email compromise" refers to a phishing attack simulation that simulates fraudulent emails impersonating executives, vendors, or trusted partners to induce unauthorized financial or data-related actions. Typical scenarios include urgent wire transfers or invoice payment requests, executive "out-of-hours" urgency emails, vendor banking detail change requests, and confidential document requests from leadership. Example attack techniques tested include display name spoofing, domain look-alike usage, social engineering and urgency pressure, and authority abuse.

As used herein, the term "QR code phishing" refers to a phishing attack simulation that simulates phishing attacks using QR codes that redirect users to credential-harvesting or malware-delivery pages, often bypassing traditional email filters. Typical scenarios include MFA or password reset notices with QR code, voicemail or secure document access via QR code, and physical poster or email-based QR campaigns. Example attack techniques tested include mobile-device exploitation, out-of-band credential harvesting, trust in visual authentication mechanisms, and reduced URL scrutiny.

As used herein, the term "malicious attachment phishing" refers to a phishing attack simulation that simulates the delivery of harmful payloads via email attachments designed to trick users into opening or enabling content. Typical scenarios include invoice or purchase order (PDF, DOCX), ZIP file containing fake documents, HTML smuggling attachments, and "secure message" attachments. Example attack techniques tested include macro-enabled document lures, HTML attachment credential harvesting, file extension spoofing, and curiosity-based social engineering.

The disclosed embodiments present a method and system for the automated generation and execution of phishing attack simulations. The method and system can automatically generate vector-specific prompts based on organizational policies, best practices, and publicly available information, thereby enabling the creation of phishing attack simulations that reflect current threat conditions. Furthermore, the method and system can autonomously generate phishing simulation templates, thereby reducing reliance on manually authored templates and enabling scalable and consistent phishing attack simulations across multiple phishing attack vectors. The method and system can retrieve and adapt phishing simulation templates using a reasoning model, thereby reducing reliance on manual configuration. Also, the method and system can generate phishing attack simulations using generative artificial intelligence models configured for different phishing attack vectors, thereby producing up-to-date, accurate, and sophisticated phishing attack simulations. Moreover, the method and system can autonomously execute the generated phishing attack simulations and analyze user interaction data, thereby enabling continuous refinement of subsequent phishing attack simulations.

The disclosed embodiments are operable within a variety of computing architectures and communication environments and are not limited to any particular hardware, software, or network configuration described herein.

The disclosed method is not a mental process and cannot be performed entirely in the human mind. Rather, the method involves technical operations that are executed within a computing environment and are tied to specific technological implementations. For example, the method includes automated prompt generation from multiple data sources, reasoning-based retrieval of phishing simulation templates, generative model-based creation of phishing attack simulations, and automated execution of the phishing attack simulations within an electronic communication environment.

The operation and effectiveness of the method depend on a variety of technical factors, including the number and type of data sources, phishing attack vectors, generative artificial intelligence models, reasoning models, and user interaction data available to the system. The method may dynamically modify phishing attack simulations based on changes in these factors, including evolving phishing tactics, observed user behavior, and an organization's policies. Such dynamic modification requires algorithmic decision-making, data classification, and automated content generation, which cannot be mentally performed by a human operator.

Moreover, although a human operator may configure high-level parameters or policies for the phishing attack simulation system, the execution of the method remains rooted in automated processing by computing systems. The operational steps involved in generating, selecting, adapting, executing, and refining phishing attack simulations are performed autonomously by the system without human intervention.

Accordingly, the disclosed method is directed to a practical application of computer technology to solve a specific problem in the field of cybersecurity. The disclosed method improves the generation and execution of phishing attack simulations through technical mechanisms, such as automated prompt generation, reasoning-based template selection, generative model-based simulation creation, and continuous refinement based on interaction data, all of which are necessarily rooted in computing technology.

FIG. 1 illustrates an example network diagram 100 utilized to describe the various disclosed embodiments.

The network diagram 100, also referred to as computing environment 100 or enterprise environment 100, illustrated in FIG. 1 includes a phishing attack simulation system, hereinafter the "system 110", deployed in a cloud computing environment 120, data sources 130-1, 130-2, 130-3, 130-4, **130-*n* (hereinafter, data source 130 in the singular or data sources 130 in the plural), all connected via a network 150**.

In at least one embodiment, the system 110 is implemented as a cloud-based service executing on one or more remote computing resources (e.g., virtual machines, containers, or serverless functions) provided by a cloud computing environment 120. The system 110 is operatively connected to a storage component 115 for storing the generated phishing attack simulations. The storage component 115 which may be realized using any suitable storage architecture. In some embodiments, the storage 115 comprises a physical storage device located locally with respect to the system 110, such as a hard disk drive (HDD), solid-state drive (SSD), network-attached storage (NAS), or other on-premises data repository. In other embodiments, the storage 115 is implemented as cloud-based storage, including object-storage services, managed database services, distributed file systems, or virtualized storage volumes provided by a cloud infrastructure.

The storage 115 may store generated phishing attack simulations, organizational policies, best practices, webpages, user interaction data, analytics information, and any additional data utilized or generated by the system 110. The system 110 may access the storage 115 through secure communication channels and may read, write, index, or update stored data as needed to support the generation and execution of phishing attack simulations. In certain embodiments, the storage 115 may be scalable, redundant, or geographically distributed to ensure reliability, high availability, and efficient performance of the system 110.

The cloud computing environment 120 may include, for example, Amazon® Web Services (AWS), Google® Cloud Services (GCS), Microsoft® Azure, Oracle Cloud®, IBM Cloud®, and the like. In at least one embodiment, a cloud computing environment 120 may be deployed in various configurations, including, but not limited to, public, private, hybrid, or edge-based configurations. In an embodiment, a cloud computing environment 120 is a virtual private cloud (VPC), a virtual network (VNet), a virtual private network (VPN), a combination thereof, and the like. The cloud computing environment 120 may include a heterogeneous cloud environment.

The network 150 also allows connectivity of users 140-1, 140-2, **140-*m* (hereinafter, user 140 in the singular or users 140 in the plural) to the system 110. In at least one embodiment, simulations generated by system 110 are transmitted to users 140. The users 140 can view and interact with the phishing attack simulations generated by system 110** by means of a user device (not shown for purposes of simplicity). A user device, also referred to as an end-user device or client device, may include a smartphone, a tablet computer, a PC, a wearable device, and the like.

Users 140 may be part of the same organization or different organizations. In the non-limiting example disclosed herein, users 140 are of the same organization and may belong to different departments (e.g., HR, R&D, finance, the like). In at least one embodiment, a user in the organization may be an administrator of the system 110 with permission to create, modify, or delete content.

As noted above, phishing attack simulations may be transmitted from the system 110 to users 140. To this end, network 150 may include a content delivery network (CDN). A CDN 150 is a distributed computing system comprising multiple geographically dispersed servers configured to store, cache, and deliver digital content to end-user devices. The CDN 150 operates by directing user requests to a server that is topologically or geographically proximate to the requesting device, thereby reducing network latency, lowering bandwidth consumption at the origin server, and improving overall content delivery performance. The CDN may include mechanisms for dynamic routing, cache management, load balancing, and fault tolerance.

A user 140 can interact with the phishing attack simulations through one or more client interfaces. For example, in various embodiments, the user 140 can provide real-time or asynchronous inputs in response to interactive elements presented within the phishing attack simulations. Such interactive elements may include, but are not limited to, opening a simulated business email compromise message, scanning a simulated QR code, or opening a simulated malicious attachment. The user's input can be sent via a client device to the system 110. In at least one embodiment, the system 110 may aggregate or analyze the user inputs, either individually or in combination with other users' inputs, to generate analytics, refine subsequent phishing attack simulations, or update user risk profiles. Thus, the system 110 enables a dynamic, feedback-driven phishing attack simulation experience in which the accuracy and sophistication of future phishing attack simulations can be improved.

In at least one embodiment, results of phishing attack simulations are incorporated into a user risk profile that represents a human risk posture. Phishing simulation outcomes are combined with additional security signals to dynamically influence subsequent phishing attack simulations, remediation actions, and prioritization of users 140 for future simulations.

In at least one embodiment, user 140 interactions with phishing attack simulations trigger automated feedback and remediation actions, including presenting explanations of identified phishing indicators, assigning targeted training content, and escalating remediation actions based on repeated interaction patterns.

According to the disclosed embodiments, the system 110 is configured to autonomously generate and execute phishing attack simulations to assess and evaluate the cybersecurity awareness and responsiveness of users 140. A phishing attack is a malicious technique in which an attacker attempts to deceive a user 140 into providing sensitive information or performing an unauthorized action. The phishing attack simulation, as carried out by the system 110, may occur through spoofed emails containing fraudulent links, malicious QR codes that redirect a device to harmful websites, or attachments designed to install malware. Simulated phishing attacks may also include deceptive messages sent via SMS or messaging applications. In at least one embodiment, phishing attack simulations include QR code phishing simulations in which generated QR codes direct users to controlled simulation endpoints accessible from mobile or external devices. In at least one embodiment, phishing attack simulations include malicious document simulations in which the system 110 generates documents configured to simulate user-driven execution of malicious content. The system 110 tracks document download events, document opening events, and user 140 interactions occurring within the document to assess user susceptibility to document-based phishing attacks. These attacks are intended to mislead the user 140 and compromise the security of the user's 140 data or device.

In at least one embodiment, the system 110 is configured to generate the phishing attack simulations using generative artificial intelligence (genAI) techniques. As described in greater detail below, such genAI techniques differ from conventional machine learning (ML) or natural language processing (NLP) approaches traditionally used to produce phishing attack simulations, enabling the dynamic creation of context-specific, adaptive, and highly customized materials.

In at least one embodiment, the system 110 integrates with enterprise messaging and security infrastructure via application programming interfaces (APIs) to inject phishing attack simulations directly into user mailboxes, bypassing email security filtering mechanisms for simulation purposes. Delivery timing, personalization, and targeting parameters are automatically applied during execution.

In an embodiment, to provide accurate and policy-compliant phishing attack simulations to users 140, the system 110 tailors the generated phishing attack simulations to reflect the organization's internal requirements and real-world cyber threat scenarios. To achieve this, the system 110 utilizes one or more data sources 130, including publicly accessible information obtained from websites (collectively represented as WWW 130-1), organizational policies 130-2, industry best practices 130-3, and phishing simulation templates 130-4. These data sources 130 enable the system 110 to generate phishing attack simulations that are relevant to the organization's operational environment and that incorporate realistic examples and conditions.

The organizational policies contained within data source 130-2 include one or more sets of policies defined and maintained by the organization. Such policies may encompass cybersecurity requirements, information technology (IT) usage rules, data handling and privacy directives, compliance guidelines, and other operational or administrative policies relevant to the organization's security posture. These policies may be uploaded to the data source repository 130-2 through the system 110 or otherwise stored therein by the organization. The organizational policies may exist in any suitable data format, including structured, semi-structured, and unstructured formats. In at least one embodiment, the system 110 is configured to process and summarize the policies stored within data source 130-2, thereby generating concise policy representations that can be indexed, referenced, or incorporated into the phishing attack simulations generated by the system 110. The summarized policies may be stored alongside or in association with the original versions to facilitate efficient retrieval and analysis.

In certain embodiments, the organizational policies 130-2 may additionally include source code or components of a code base used within the organization. The code base may comprise scripts, configuration files, access-control rules, API usage guidelines, secure-coding checklists, or other programmatic artifacts that demonstrate how systems and applications should be securely implemented or operated. In the context of cybersecurity, such code-base elements can provide real-world examples of secure and insecure coding patterns, illustrate proper input-validation techniques, demonstrate appropriate cryptographic usage, or show how misconfigurations can lead to exploitable vulnerabilities.

The best practices contained within data source 130-3 include standards, guidelines, and recommended procedures derived from recognized industry frameworks or authoritative cybersecurity sources. These best practices may include, for example, guidelines published by organizations such as NIST, ISO/IEC, CIS, OWASP, and other cybersecurity or compliance bodies. Best practices may cover topics such as secure password management, acceptable-use standards, incident-response procedures, secure software development, data protection requirements, and risk-mitigation methodologies. In at least one embodiment, the system 110 retrieves, analyzes, and updates these best practices to ensure that the generated phishing attack simulations reflect current industry norms and emerging threat models. The best practices may also be stored in structured or unstructured form, and the system 110 may normalize or summarize the information to enable efficient integration into phishing attack simulations.

In at least one embodiment, webpages provided by data source 130-1 serve as a dynamic data source that provides real-world examples of cyber threats, current attack techniques, and emerging security trends. Webpages may include publicly available articles, incident reports, threat advisories, security blogs, product documentation, or examples of malicious or suspicious websites used in phishing, malware distribution, or social-engineering attacks.

The system 110 may analyze these webpages to extract relevant information, such as common phishing templates, deceptive visual patterns, misleading URL structures, or examples of fraudulent login pages, and incorporate such information into the generated phishing attack simulations. This enables the system 110 to create highly up-to-date phishing attack simulations. In addition, webpages may provide additional information, including dynamically updated data, which is usable to adapt phishing attack simulations to evolving threat conditions that the system 110 can integrate into the generated phishing simulation templates and the generated phishing attack simulations.

Template data source 130-4 is configured to store, manage, and provide access to phishing simulation templates usable by the system 110. The template data source 130-4 may store phishing simulation templates that are generated by a template generator engine (not shown in FIG. 1), as well as template metadata associated with the phishing simulation templates. In at least one embodiment, the template data source 130-4 is accessible by a reasoning model "director" (not shown in FIG. 1) configured to retrieve, select, or adapt phishing simulation templates based on a generated prompt and a selected phishing attack vector.

In at least one embodiment, the template data source 130-4 stores template metadata including one or more of phishing attack vector identifiers, structural attributes, content features, difficulty indicators, and versioning information. Such metadata enables automated selection, ranking, and adaptation of phishing simulation templates without human intervention.

In at least one embodiment, the template data source 130-4 is dynamically updated as new phishing simulation templates are generated or existing templates are modified. The template data source 130-4 may further maintain historical template versions and usage information to support reuse, comparison, and refinement of phishing simulation templates across multiple phishing attack simulations.

It should be noted that by leveraging the information from the data sources 130 as discussed above, the system 110 ensures that the phishing attack simulations remain current, relevant, and aligned with an evolving cybersecurity landscape.

In some embodiments, the data sources 130-1, 130-2, 130-3, and 130-4 are realized as logical repositories hosted within the cloud environment 120 and accessible to the system 110 via one or more networks. Each data source 130 may be implemented using any suitable storage technology, including, for example, relational databases, NoSQL databases, object-storage services, file-based repositories, or combinations thereof. The webpages/WWW content 130-1, organizational policies 130-2, best practices 130-3, and templates 130-4 may be stored in separate physical storage instances or co-located within a shared storage service, and may be partitioned, replicated, or distributed across multiple regions or availability zones to enhance scalability and resilience. In at least one embodiment, the system 110 accesses these data sources 130 through secure application programming interfaces (APIs), data connectors, or managed cloud services, thereby enabling the system 110 to retrieve, index, update, and process the data sources as part of the generation of phishing attack simulations.

It will be appreciated that the diagram of FIG. 1 is provided for purposes of illustration and is not intended to limit the disclosed embodiments to the specific architecture, arrangement of components, or configuration shown therein. Additionally, fewer or alternative components may be included, and the illustrated components may be combined, separated, or implemented in different forms without departing from the scope of the present disclosure.

Figure 2:
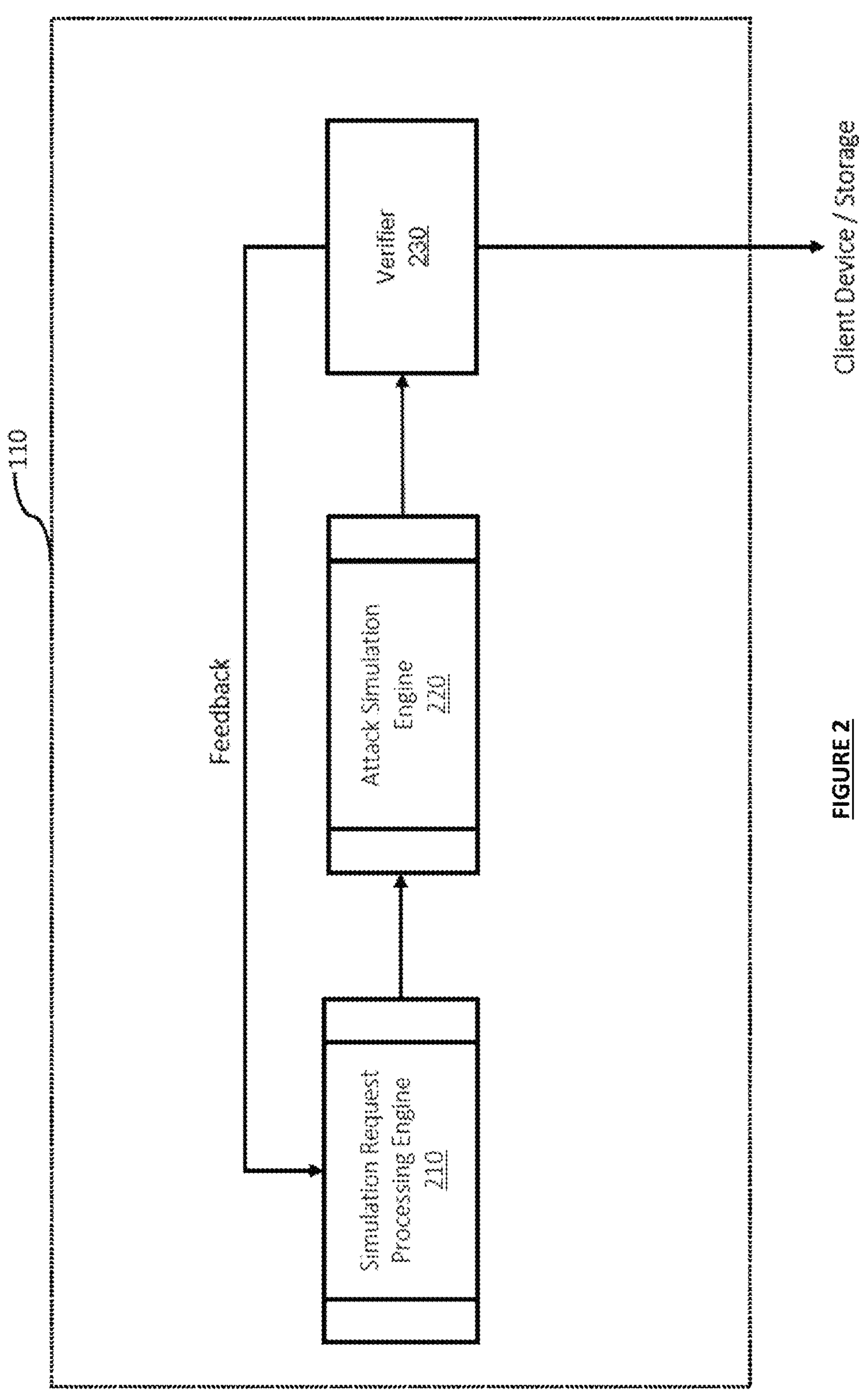
FIG. 2 is a functional diagram of a phishing attack simulation system according to at least one embodiment.

FIG. 2 illustrates an example functional diagram of the system 110 according to at least one embodiment. As shown in FIG. 2, the system 110 may include, but is not limited to, a simulation request processing engine 210 and an attack simulation engine 220, all of which are operatively connected to a verification engine 230. Each engine 210, 220, 230, of the system 110 may retrieve or otherwise consume data from data sources 130 described with respect to FIG. 1.

The simulation request processing engine 210 is configured to receive and interpret a request to generate and execute a phishing attack simulation. Such a request may be submitted, for example, by an administrator of the system 110 or by another authorized entity. Upon receiving the request, the simulation request processing engine 210 analyzes the request to determine the intent of the request and routes the processed request to the attack simulation engine 220.

In some embodiments, the simulation request processing engine 210 is further configured to enrich the received request with additional contextual information retrieved from one or more of the data sources 130. For example, at an initial stage, the engine 210 may identify a user or administrator submitting the request and, based on such identification, retrieve relevant organizational information, including an organization's name, geographic location, industry classification, applicable security policies, and types of phishing attack simulations permitted or required for the organization. The request processing engine 210 may also retrieve user-specific preferences, historical simulation performance, or compliance requirements to refine and contextualize the request. The resulting output of the request processing engine 210 is an enriched prompt containing derived context, which is then supplied to the attack simulation engine 220 to support accurate and tailored content generation or analysis.

In at least one embodiment, the attack simulation engine 220 is configured to generate and execute phishing attack simulations for users 140 of an organization across a plurality of phishing scenarios. Such scenarios include, without limitation:

(i) generation of realistic, brand-specific phishing emails derived from legitimate electronic communications associated with software-as-a-service (Saas) providers, including automatic ingestion of a single genuine SaaS email (e.g., "Welcome to Company A") and generation of multiple scenario variants for the same SaaS provider (e.g., password resets, new-device logins, billing or payment notifications, account changes, onboarding messages, and receipt or invoice notifications) based on the email's visual and structural template (e.g., HTML/CSS layout, logo placement, colors, button styles) and extracted textual patterns (e.g., greeting style, tone, typical phrasing);

(ii) scoring and explaining phishing characteristics, whereby generated phishing simulations are evaluated according to a phishing indicator scale to identify phishing indicators, including typographical anomalies, generic greetings (e.g. "Dear User"), sender-domain inconsistencies (e.g., display name versus actual sender domain), urgency language (e.g., "urgent", "immediately", "your account will be closed"), and suspicious call-to-action patterns, whereby structured explanation data is generated for user-facing feedback, and whereby the identified phishing indicators are used to inform the user 140 what they should have noticed when they fell for the simulation and provide specific guidance (e.g., "You should have checked the sender domain", "The urgent language is a classic red flag");

(iii) business email compromise (BEC) and tailored phishing scenarios based on high-level natural language scenario descriptions, including executive impersonation, invoice fraud (e.g., "invoice reminder for marketing campaign"), payment requests, gift card scams (e.g., "gift card request from CEO"), and fake job applications (e.g., "fake candidate email for data science position"), and whereby the attack simulation engine 220 tailors the email by: (1) mapping the scenario to a predefined phishing tactic taxonomy (e.g., "create sense of urgency", "CEO gift card scam", "fake job application", "payment/billing update request"); and (2) performing contextual gathering using organizational and publicly available information (e.g., "open positions on the company careers page", office locations/branches, relevant vendors/SaaS tools the company actually uses) to generate realistic content (e.g., a fake applicant referencing a real, open role at the company, a fake invoice from a SaaS tool the organization actually uses, a message that algins with the organization's real structure (i.e., titles, departments, etc.);

(iv) QR code-based phishing simulations ("QRishing") in which generated QR codes direct users 140 to controlled simulation endpoints, including scenarios testing whether users 140 will scan unknown QR codes, often from physical media or screens, and testing mobile-device behavior outside an organizational security perimeter;

(v) malicious document phishing simulations, including generation of realistic documents such as receipts, contracts, spreadsheets, reports, or statements, that, for example, instruct users 140 to download an attached/linked file, open it locally, or perform a sequence of actions (e.g., "click here, then enable X . . . ") that simulate macro-script execution, and tracking whether users 140 download, open, and interact with such documents in a manner representative of user-driven execution of malicious content;

(vi) campaign delivery and execution scenarios via integration with enterprise messaging and/or security infrastructure (e.g., security connectors, APIs), including direct injection of phishing attack simulations into user mailboxes while bypassing traditional email security filters, ensuring the phishing emails actually reach employees. Additionally, system 110 supports personalized targeting based on user 140 or organizational SaaS usage (e.g., phishing template chosen only for SaaS the user 140 uses, maximizing realism and click relevance), and configurable delivery windows (e.g., weekly campaigns, specific time ranges). In an administrator workflow example, this may involve choosing a scenario (e.g., phishing email, QR code, malicious document), reviewing and optionally editing the generated content, configuring the target population and schedule, and launching the campaign;

(vii) interaction tracking and verification scenarios, including detection of opens, clicks, downloads, and submissions to determine if an email was opened and identify exactly which user 140 clicked (based on encoded user/campaign identifiers and unpacked signatures). Additionally, the interaction tracking and verification scenarios include distinguishing human user interactions from automated scanning activity using interaction behavioral (e.g., mouse movement, button clicks, form interaction), time-of-day patterns (e.g., unrealistic access times), and network-based (e.g., checking IP address ranges and comparing to known corporate IPs/VPN endpoints and known security scanning infrastructure) indicators, and whereby knowledge of an organization's topology and VPN configurations (learned during onboarding) are used to define rules "likely human" versus "likely bot" clicks, thereby reducing false positives in simulation results;

(viii) user feedback, remediation, and escalation scenarios, including immediate feedback identifying missed phishing indicators (e.g., "you missed a suspicious link", "you downloaded a risky document", explanation of red flags a user 140 misses using the phishing-scale analysis), assignment of targeted training content (e.g., assign a micro-course or video), automated reminders (e.g., send multiple reminders via email or through integrated platforms), or escalation based on repeated interaction patterns (e.g., mandatory longer training), and audit and reporting (e.g. logging all actions for management/security officer dashboards and measuring improvement over time such as "six months ago the user 140 clicked, and now they don't"); and (ix) integration of phishing simulation outcomes into a user risk profile representing a human risk posture, whereby simulation results (e.g., "clicked on malicious document", "entered credentials on fake page", "ignored suspicious email" versus "reported phishing") are combined with additional security signals (e.g., MFA usage, password reuse, file sharing to external users) to prioritize users 140 for future simulations and tailor follow-up actions (e.g., specific follow-up steps per user 140 or group of users 140).

Together, these scenarios enable the attack simulation engine 220 to autonomously generate, execute, evaluate, and adapt phishing attack simulations that are realistic, context-aware, and aligned with evolving cyber threat behavior.

In operation, the attack simulation engine 220 may transmit generated phishing attack simulations to selected users 140 via direct integration with an organization's messaging or email infrastructure, including, for example, injecting messages directly into user mailboxes via application programming interfaces while bypassing or coordinating with existing security controls for simulation purposes. Each simulated message or artifact may include tracking elements, such as uniquely signed links, identifiers, and tracking pixels, detection of opens, clicks, downloads, submissions, and subsequent interactions. The attack simulation engine 220 can further apply interaction verification logic, including evaluation of source network characteristics, time-of-access patterns, and interaction behavior at a controlled simulation endpoint, to distinguish genuine user actions from automated scanners. When a user 140 interacts with a simulated phishing communication, the system 110 may provide immediate feedback identifying the one or more phishing indicators and, optionally, assign follow-up remediation actions, including targeted micro-learning content, additional training courses, or reminders delivered through collaboration tools. Results of such simulations may be recorded and supplied to other components of the system 110, including a human risk posture engine (not shown for purposes of simplicity), to update a user risk profile and support prioritization of users 140 for future simulations.

In at least one embodiment, the system 110 includes a capability to generate code-based artifacts, including web content or websites, as part of generating phishing attack simulations. In such embodiments, the verification engine 230 applies one or more verification processes to ensure generated outputs comply with secure-coding best practices and organizational requirements. The verification engine 230 may run a verification process, by one or more Gen-AI models, that evaluates generated outputs to confirm correctness, adherence to organizational coding conventions, and alignment with established security standards, including checking for common vulnerabilities, validating proper API usage, and confirming compliance with industry best practices. In at least one embodiment, the verification engine 230 includes a genAI vision-based model configured to review rendered webpages or UI components to confirm that an appearance corresponds to an intended design. The verification engine 230 provides iterative feedback to the engines 210 and 220 to enable corrections within the same execution workflow and ensure that the final created phishing attack simulation is accurate and suitable for transmission to one or more users 140.

In at least one embodiment, the verification engine 230 includes a phishing characteristic evaluation module (not shown for purposes of simplicity) configured to analyze generated phishing attack simulations according to a standardized phishing indicator scale. The phishing characteristic evaluation module identifies phishing indicators, including, without limitation, generic greetings, urgent language, sender-domain inconsistencies, suspicious call-to-action patterns, and formatting anomalies. Identified phishing indicators are stored as structured explanation items and associated with corresponding phishing attack simulations for use in user feedback and remediation.

In at least one embodiment, the verification engine 230 includes an interaction verification module (not shown for purposes of simplicity) configured to distinguish human user interactions from automated scanning activity. The interaction verification module evaluates network characteristics, access timing, and interaction behavior associated with phishing attack simulations to suppress false positives caused by automated security scanners or bots.

It should be noted that system 110 and any of its engines 210, 220, and 230 may be implemented as software code. The system 110 may be realized often as just-in-time compiled software code. As used herein, the term "software" refers to one or more sequences of instructions, logic, or routines, including but not limited to source code, object code, intermediate code, interpretable code, or executable code, that may be stored on a non-transitory computer-readable medium and executed by one or more processors. The software may be implemented using one or more machine learning frameworks, including but not limited to TensorFlow™, PyTorch™, ONNX™, or equivalent platforms.

Figure 6:
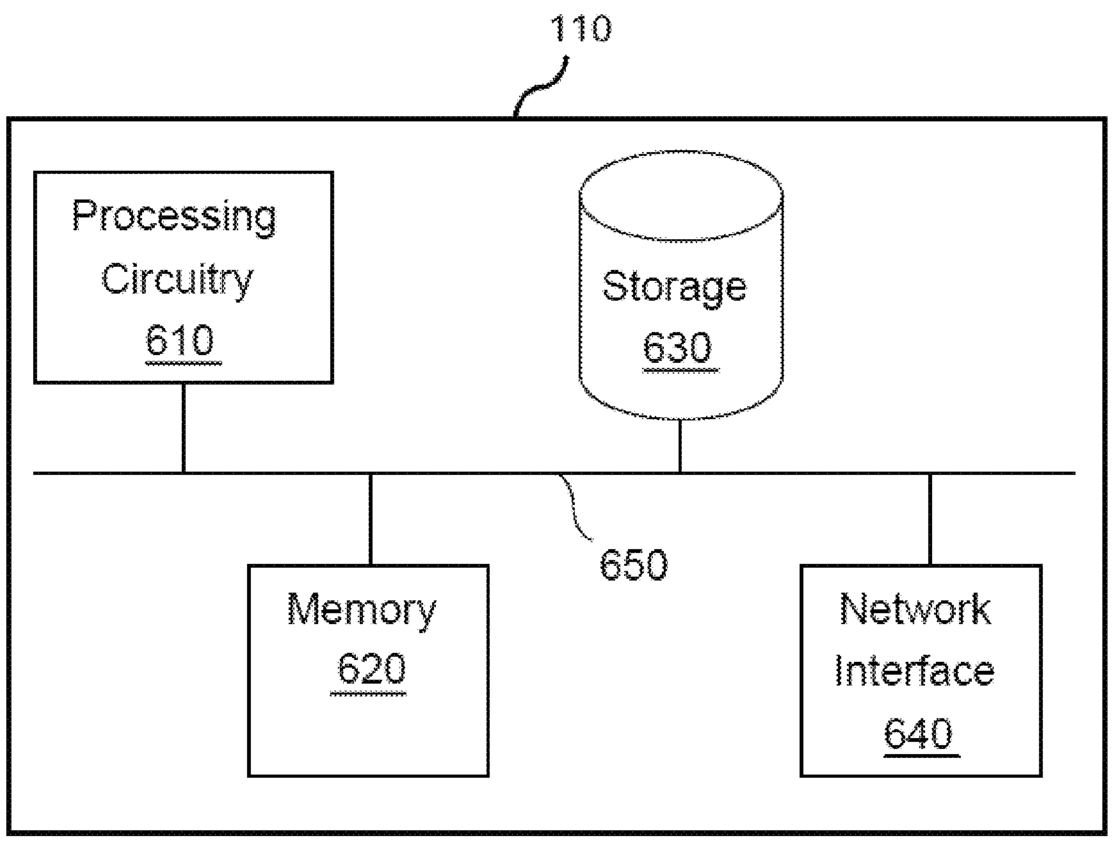
FIG. 6 is a block diagram of a computing architecture of a phishing attack simulation system according to at least one embodiment.

The software may be executed in virtualized environments, such as containers or serverless architectures, or may be deployed via cloud infrastructure. The term "hardware" refers to one or more physical computing devices or components capable of performing operations, including model training, inference, and/or data processing. Non-limiting examples of hardware include central processing units (CPUs), graphics processing units (GPUs), tensor processing units (TPUs), application-specific integrated circuits (ASICs), field programmable gate arrays (FPGAs), neural processing units (NPUs) or equivalent dedicated AI accelerators; on-device microcontrollers or edge processors capable of running trained models, and the like. The described embodiments are not limited to any particular implementation platform and may be deployed across heterogeneous environments comprising combinations of the above. An example of the system's 110 hardware implementation is shown in FIG. 6.

It will be appreciated that the functional arrangement illustrated in FIG. 2 is merely an example and that additional, fewer, or alternative engines or modules may be employed without departing from the scope of the embodiments disclosed herein.

Figure 3:
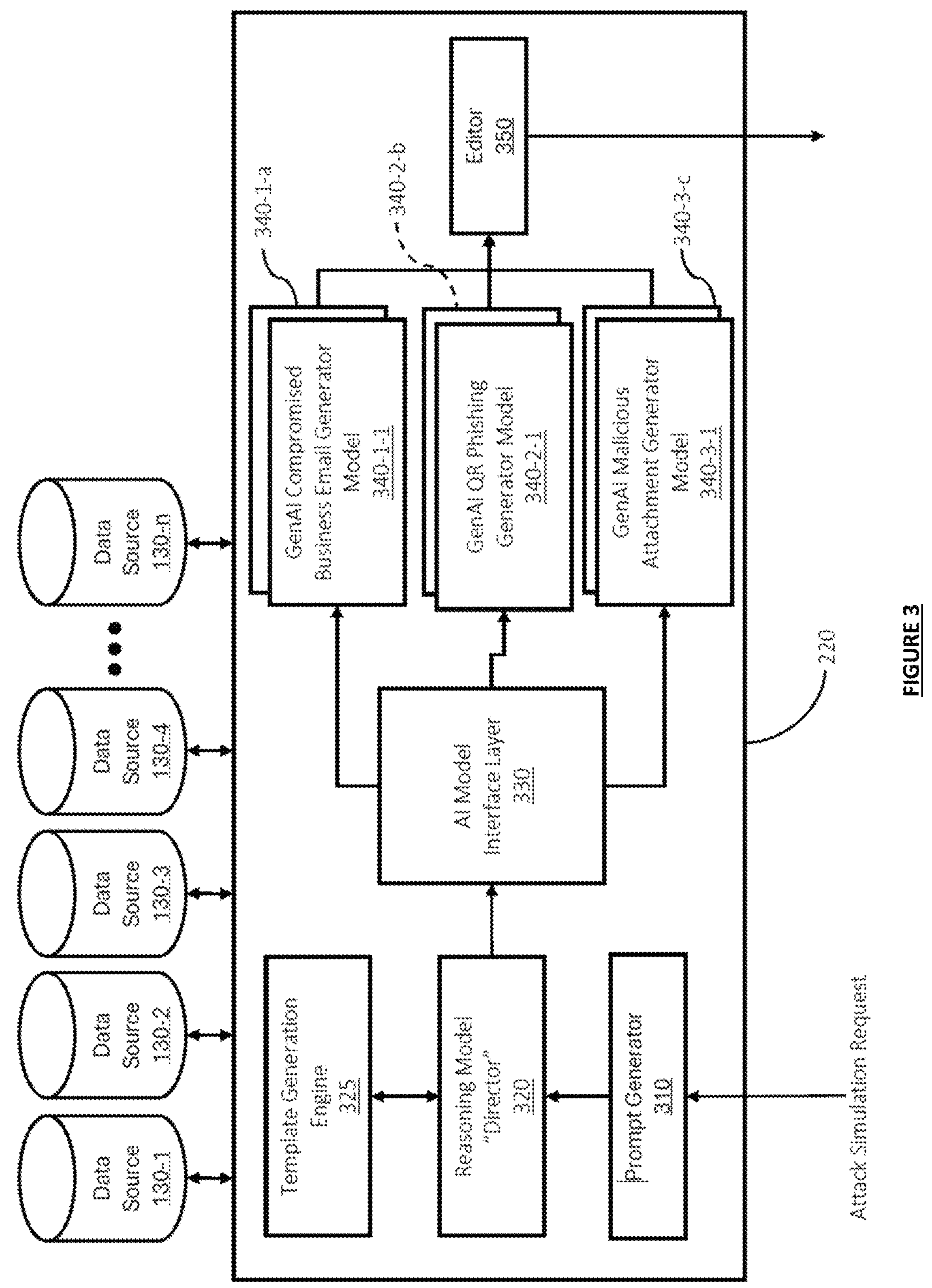
FIG. 3 is a functional diagram of an attack simulation engine according to at least one embodiment.

FIG. 3 is an example functional diagram of the attack simulation engine 220 implemented according to at least one embodiment. The attack simulation engine 220 is configured to generate phishing attack simulations tailored to the specific needs defined by the organization's policies and best practices, and phishing simulation templates. As previously described above, the phishing attack simulations may include, without limitation, business email compromise phishing, QR code phishing, and malicious attachment phishing.

In at least one embodiment, the attack simulation engine 220 includes, but is not limited to, a prompt generator 310, a reasoning model "director" 320, a template generation engine 325, an AI model interface layer 330, a plurality of genAI models of various types 340-1-1, **340-1-*a*, 340-2-1, 340-2-*b*, 340-3-1, 340-3-*c* (whereby a, b, c are integer numbers greater than 1), and an editor 350. The attack simulation engine 220 is operatively connected to the data sources 130, as described above. The plurality of genAI models will be referred to as genAI models 340-1, 340-2, or 340-3 in the singular, or as genAI models 340** in the plural.

As discussed in greater detail below, the reasoning model "director" 320, hereinafter referred to as director, a plurality of genAI models 340, and an editor 350 collectively realize one or more language-model-based processing pipelines. The prompt generator 310 is configured to create, assemble, or refine prompts, whereby a prompt includes one or more structured text inputs that guide how a language model produces its responses. In particular, the prompt generator 310 generates optimized and context-aware instructions prior to passing a request to the director 320. The prompt generator 310 operates in conjunction with one or more data sources 130, including internal sources such as organizational policies, industry best practices, and code-base materials, as well as external sources such as publicly available information obtained from the internet.

In at least one embodiment, the prompt generator 310 receives a processed request from the simulation request processing engine 210. Upon receiving the processed request, the prompt generator 310 selectively queries one or more data sources 130 to retrieve information relevant to the subject matter and constraints of the request, and incorporates such information into the generated prompt.

For example, in a business email compromise phishing scenario, the processed request may specify a simulated invoice reminder originating from an executive role. In response, the prompt generator 310 queries one or more data sources 130 to retrieve information, including organizational hierarchy data, commonly used financial communication patterns, and publicly available information regarding business email compromise tactics. The prompt generator 310 incorporates the retrieved information into a prompt configured to simulate an executive-impersonation email request for an urgent financial action while conforming to organizational policies and predefined simulation constraints.

In another example, in a QR code phishing scenario, the processed request may specify a simulated security notification or account verification request delivered via a QR code. In response, the prompt generator 310 queries one or more data sources 130 to retrieve information, including prevalent QR-based phishing techniques, mobile-device interaction patterns, and best practices related to secure access notifications. The prompt generator 310 incorporates the retrieved information into a prompt configured to generate a phishing attack simulation that includes a QR code directing a user 140 to a controlled simulation endpoint, consistent with the subject matter and constraints of the request.

In another example, in a malicious attachment phishing scenario, the processed request may specify a simulated document delivery associated with an invoice, report, or contract. In response, the prompt generator 310 queries one or more data sources 130 to retrieve information, including commonly abused document formats, document-based social engineering techniques, and publicly observed attachment-based phishing patterns. The prompt generator 310 incorporates the retrieved information into a prompt configured to generate a phishing attack simulation in which a user 140 is prompted to open a simulated document and perform one or more actions representative of malicious document execution behavior, while avoiding delivery of actual malicious content.

In at least one embodiment, the prompt generator 310 is configured to generate "clean" prompts that avoid overloading downstream models with unnecessary source material. For example, rather than injecting entire source documents, the prompt generator 310 selectively injects only the needed distilled/structured policy guidance and other relevant excerpts applicable to a particular request and may discard raw web-derived content after extracting what is needed.

Accordingly, the prompt generator 310 is further configured to collect relevant contextual information from one or more data sources 130, distill the collected information to identify portions applicable to the received request, and enrich the request with the distilled context. In this manner, the prompt generator 310 provides the director 320 and downstream generative models with prioritized guidance to accurately generate requested content or analysis. By supplying context-aware and policy-aligned prompts at an early stage, the system 110 reduces corrective iterations and improves output accuracy while reducing the overall computational resources and processing time required to fulfill the request.

In at least one embodiment, the director 320 is implemented as a reasoning model. A reasoning model 320 is a machine-executable model configured to analyze an input request in view of contextual information and predefined constraints, and to generate a structured plan or set of decisions that governs operation of one or more downstream models or processing components. Rather than directly producing end content, the reasoning model 320 evaluates intent, applies organizational policies and best practices, decomposes a request into one or more subtasks, and determines which tools or generative models should be invoked for each subtask to produce a coherent and policy-compliant result.

In at least one embodiment, the director 320 is configured to receive one or more enriched prompts generated by the prompt generator 310 and to orchestrate content generation across the plurality of genAI models 340. In response to a received prompt, the director 320 determines a set of subject-specific instructions, whereby each instruction corresponds to a distinct content component or task and is processed by a respective genAI model of the plurality of models 340.

In at least one embodiment, upon receiving an enriched prompt, the director 320 processes the enriched prompt to determine one or more attributes of a corresponding phishing attack simulation, including a phishing attack vector, scenario type, and applicable constraints. Based on such determination, the director 320 queries the template generator engine 325 to retrieve, select, or adapt one or more phishing simulation templates corresponding to the enriched prompt. In at least one embodiment, the director 320 evaluates metadata associated with available phishing simulation templates and identifies a template satisfying subject matter, structural characteristics, and constraints specified in the enriched prompt. The retrieved phishing simulation template is then provided for subsequent generation of a phishing attack simulation without the director 320 generating phishing attack content. In at least one embodiment, the director 320 queries the template generator engine 325 using one or more of semantic similarity, phishing attack vector classification, and constraint matching derived from the enriched prompt.

In at least one embodiment, the director 320 operates as an authoring and planning component. Rather than immediately invoking all available generation tools, the director 320 evaluates enriched context and the user objectives to produce a structured content plan, referred to herein as a "menu." The menu defines a coherent outline or narrative for a phishing attack simulation and includes a task decomposition identifying content elements to be generated. The director 320 selects among a predefined set of generation capabilities and determines which capabilities are required to achieve a consistent and complete output.

In at least one embodiment, the director 320 generates the menu and associated task definitions as structured output, such as a machine-readable representation (e.g., JSON), to enable reliable parsing and routing of tasks to specialized downstream genAI models 340. For each task, the director 320 instantiates a task-specific prompt using predefined prompt segments that specify formatting rules, style constraints, output structure, and permitted content elements. The director 320 embeds within each task prompt prioritized contextual constraints, including organizational policies as mandatory authorities, followed by industry best practices, optional code-base context, and web-derived information for currency. By limiting injected context to distilled or summarized information rather than entire source documents, the director 320 avoids context-window exhaustion and prompt contamination.

In at least one embodiment, the director 320 validates structured outputs produced during planning and task instantiation. If a structured output is malformed, the director 320 may invoke a corrective model to repair the output before execution by downstream models. After the plurality of genAI models 340 generate their respective task outputs, the director 320 and/or the editor 350 may perform a coherence pass to integrate the outputs into a unified and consistent phishing attack simulation. This staged orchestration reduces unnecessary recomputation and helps ensure content alignment and narrative consistency prior to delivery.

The template generation engine 325 is configured to autonomously generate phishing simulation templates for use in generating and executing phishing attack simulations. The template generation engine 325 operates without human intervention and performs a sequence of automated processing steps to transform electronic communications and external intelligence into reusable phishing simulation templates, as further described below during the discussion of FIG. 5.

In at least one embodiment, the template generator engine 325 includes (all not shown for purposes of simplicity) one or more of a sanitization module, a content classification module, a structural analysis module, a template variation generation module, a placeholder insertion module, a policy enforcement module, and one or more large language models (LLMs) configured to cooperatively generate phishing simulation templates.

In at least one embodiment, the template generator engine 325 is further configured to retrieve electronic communications from one or more data sources 130 and sanitize the electronic communications to remove personally identifiable information (PII) and personal information, as well as normalize the electronic communications using the sanitization module. The sanitized electronic communications are processed to extract both content-based features and structural features, including layout, formatting, and presentation characteristics.

In at least one embodiment, the template generator engine 325 includes one or more classification components (e.g., content classification module) configured to classify information contained within sanitized electronic communications, including entity identifiers, organizational references, content categories, and contextual indicators relevant to phishing attack simulations. In at least one embodiment, the template generator engine 325 further performs structural classification to identify visual and formatting elements usable to reproduce realistic phishing attack characteristics using the structural analysis module.

In at least one embodiment, the template generator engine 325 includes one or more genAI models, such as large language models, configured to generate phishing simulation templates based on classified content and structural features. The genAI models 340 are configured to incorporate open-source intelligence (OSINT) indicators representative of current phishing tactics, techniques, and procedures to generate template variants reflecting current threat behavior.

In at least one embodiment, the template generator engine 325 is further configured to ensure that generated phishing simulation templates comply with predefined organizational, legal, and operational constraints using the policy enforcement module.

In at least one embodiment, the template generator engine 325 is further configured to insert placeholders corresponding to employee-specific or contextual information into the generated phishing simulation templates using the placeholder insertion module, thereby enabling parameterized use of the templates during phishing attack simulation execution. The generated phishing simulation templates may be stored in a template data source 130-4 together with associated metadata to support automated retrieval, selection, and adaptation by the reasoning model "director" 320.

In at least one embodiment, the template generator engine 325 is further configured to ingest an electronic communication originating from at least one software-as-a-service (SaaS) provider and analyze the electronic communication to identify brand-specific visual, structural, and textual patterns. The template generator engine 325 extracts layout characteristics, styling attributes, and linguistic patterns and generates a plurality of phishing simulation templates corresponding to different phishing scenarios associated with the same SaaS provider, including password reset notifications, login alerts, billing updates, and account change notifications.

In at least one embodiment, the template generator engine 325 is further configured to produce multiple distinct phishing simulation template variants from a common source representation using the template variation generation module. The common source representation may correspond to a sanitized electronic communication, a base phishing simulation template, or a structured template representation derived therefrom. The template variation generation module modifies one or more content, structural, or contextual elements of the common source representation to generate a plurality of phishing simulation template variants, including variations in wording, tone, layout, call-to-action elements, and visual presentation, while preserving overall realism and consistency with a selected phishing attack vector.

In at least one embodiment, the template generator engine 325 is further configured to perform template generation entirely autonomously as part of a phishing attack simulation pipeline, thereby reducing reliance on manually authored templates and enabling scalable, up-to-date, and sophisticated phishing attack simulations across multiple phishing attack vectors.

In at least one embodiment, the task-specific prompts generated by the director 320 are processed by the AI model interface layer 330 before being relayed to respective genAI models 340. The AI model interface layer 330 is configured to route prompts received from the director 320 to an appropriate genAI model type based on a content modality required by the prompt to select, from among multiple genAI models of the same type, a particular genAI model that satisfies one or more performance criteria, including computational cost, token usage, execution latency, availability, or compute-resource requirements.

For example, a plurality of genAI models 340-2-1 through **340-1-*b* may each be configured as QR phishing generation models. When a prompt requesting generation of a QR code phishing attack simulation is received, the AI model interface layer 330 routes the prompt to one of the genAI models 340-2-1 through 340-1-*b* based on evaluated performance criteria. To enable such selection, the AI model interface layer 330 maintains registration information for available genAI models 340, monitors execution characteristics of the genAI models 340, and dynamically selects and routes prompts to suitable genAI models 340** at runtime.

The AI model interface layer 330 provides a modular and flexible mechanism for utilizing genAI models without requiring changes to individual model code or to the overall architecture of the attack simulation engine 220. Accordingly, as new genAI models and/or new versions of existing genAI models are introduced, such models may be added to system 110, and their utilization may be governed by the routing and selection logic implemented by the AI model interface layer 330.

According to the disclosed embodiments, a genAI model 340-1, 340-2, and/or 340-3 generates content based on the input prompt(s) generated by the director 320. Further, each of the plurality of genAI models 340 is a machine-executable model configured to generate new content artifacts in response to an input prompt, rather than merely classifying or retrieving existing data. In the disclosed embodiments, each type of the plurality of genAI models 340 includes specialized models for different content modalities used in phishing attack simulations. For example, a text-based genAI model may generate message content; a code-generation genAI model may generate code-based artifacts for controlled simulation endpoints; an image-generation genAI model may generate images or visual elements; and a web-content genAI model may generate websites, login pages, or rendered email or chat interfaces. Each genAI model 340 may be optimized for a particular content modality and may be selectively invoked by a director 320 or orchestration component to collectively produce a coherent phishing attack simulation.

In at least one embodiment, a genAI model 340-1, 340-2, or 340-3 of a specific type may include one or more commercially available, open-source, or proprietary generative models configured to produce content in a particular modality. For example, a text-generation genAI model 340-1, 340-2, or 340-3 may include language models capable of generating dialogue segments or titles (e.g., models similar to GPT®, Gemini®, or Claude®). A code-generation genAI model 340-1, 340-2, or 340-3 may include models configured to generate programming code or configuration artifacts (e.g., models similar to Codex®, Code LLaMA®, or StarCoder®). An image-generation genAI model 340-1, 340-2, or 340-3 may include diffusion-based or transformer-based models configured to generate images or visual elements (e.g., models similar to DALL·E®, Stable Diffusion®, or Imagen®). A multimodal genAI model 340-1, 340-2, or 340-3 may be configured to process and generate content across multiple modalities, including combinations of text and images. The specific genAI models utilized may vary over time, and any suitable generative model capable of producing the required content type may be employed without departing from the scope of the disclosed embodiments.

In at least one embodiment, the editor 350 is configured to orchestrate and edit outputs of the genAI models 340 to produce a comprehensive phishing attack simulation aligned with organizational policies and industry best practices. For example, the editor 350 may evaluate generated content for consistency, logical flow, and compliance and may resolve discrepancies between outputs generated by different genAI models 340. In at least one embodiment, the editor 350 restructures or rephrases content, aligns terminology and style, removes redundant or conflicting information, and verifies that references to policies, procedures, or examples are accurate and consistent.

In at least one embodiment, the system 110 is executed on a hardware layer (not shown in FIG. 3) comprising one or more computing devices configured to execute generative logic, one or more reasoning models, one or more language models, and one or more genAI models as discussed with reference to FIG. 3. That is, the hardware layer may be configured to execute the prompt generator 310, the director 320, the AI interface layer 330, the genAI models 340, and the editor 350. The hardware layer may include processors such as central processing units (CPUs), graphics processing units (GPUs), tensor processing units (TPUs), or other specialized accelerators capable of supporting large-scale model inference and training. The hardware resources may be deployed on-premises, in a cloud-computing environment, or in a hybrid configuration, and may include memory, storage, and networking components sufficient to support parallel execution, load balancing, and scalable processing of genAI workloads.

Figure 4:
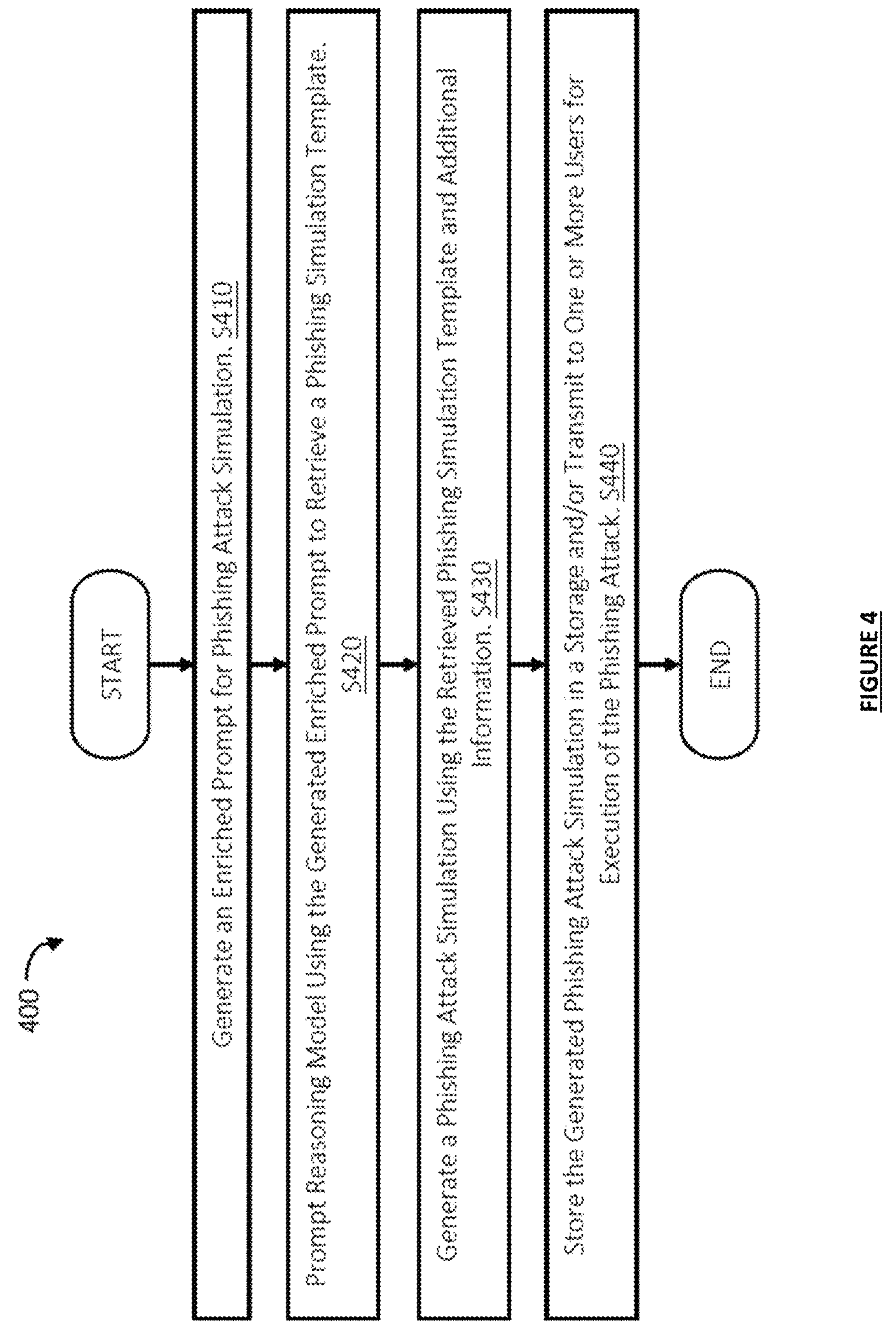
FIG. 4 is an operational flowchart illustrating a process for generating and executing phishing attack simulations according to at least one embodiment.

FIG. 4 is an operational flowchart diagram illustrating a method 400, also referred to as process 400, for generating and executing phishing attack simulations according to at least one embodiment. In some embodiments, the method 400 may be performed by a system, such as phishing attack simulation system 110 illustrated in FIGS. 1 and 2. The method 400 is executed to autonomously generate and execute phishing attack simulations without human intervention. The method 400 will be discussed with reference to the elements shown in FIGS. 1, 2, and 3.

At S410, an enriched prompt for a phishing attack simulation is generated In at least one embodiment, the enriched prompt is generated upon receiving a user request from the simulation request processing engine 210. In at least one embodiment, an enriched prompt corresponding to a selected phishing attack vector is generated, for example, by the prompt generator 310. A selected phishing attack vector can include a business email compromise, QR code phishing, or malicious attachment phishing. In at least one embodiment, the prompt generator 310 generates the prompt by collecting contextual information obtained from one or more data sources 130, including a World Wide Web (WWW) data source 130-1 representative of current phishing-related information, an organizational policies data source 130-2, and a best practices data source 130-3. The user request may be provided in a structured, unstructured, or semi-structured form.

In at least one embodiment, the enriched prompt is generated by instantiating one or more predefined prompt templates with a set of variables. A prompt template defines a fixed structure for a prompt, and the variables represent dynamic values provided by a user 140 and/or retrieved from one or more data sources 130. The variables may include, for example, organizational identifiers, user roles, target audience groups, applicable policies, preferred content formats, languages, tone, regulatory requirements, technology stacks, and recent threat information.

In at least one embodiment, the prompt template is populated by selectively retrieving contextual information from the data sources 130, distilling such information, and assigning the distilled information to corresponding variables within the prompt template. As noted above, the resulting enriched prompt preserves a consistent prompt structure while embedding request-specific and organization-specific context, thereby enabling downstream reasoning and generative models to operate using accurate, policy-aligned instructions and reducing iterative prompt refinement. In at least one embodiment, the generated prompt is stored in a structured, machine-readable format, such as JSON.

In at least one embodiment, the system 110 receives a natural language phishing scenario description and automatically maps the description to a predefined phishing tactic taxonomy. The system 110 further performs automated context gathering using internal and external data sources, including one or more of the storage component 115 and the data sources 130, to tailor phishing attack simulations to an organization, role, or individual, including generating business email compromise simulations that reference organizational structure, vendors, job postings, or publicly available information.

At S420, the generated enriched prompt is used to prompt the director 320 to select and retrieve a phishing simulation template corresponding to the selected phishing attack vector. In at least one embodiment, the phishing simulation template is selected and retrieved from the template data source 130-4. In at least one embodiment, an appropriate phishing simulation template and associated simulation parameters are determined based on the enriched prompt. Associated simulation parameters corresponding to a phishing attack simulation can include a phishing attack vector, scenario type, and applicable constraints. Based on such determination, the template generator engine 325 is queried to retrieve, select, or adapt one or more phishing simulation templates corresponding to the enriched prompt. In at least one embodiment, the director 320 evaluates metadata associated with available phishing simulation templates and identifies a template satisfying subject matter, structural characteristics, and constraints specified in the enriched prompt. In at least one embodiment, the director 320 queries the template generator engine 325 using one or more semantic similarity, phishing attack vector classification, and constraint matching derived from the enriched prompt.

In at least one embodiment, the enriched prompt is further processed to generate a structured content plan and a plurality of genAI tasks. Each genAI task corresponds to a specific content element to be generated and is associated with a particular genAI model type. The genAI tasks may include, for example, generation of message content, landing pages, images, attachments, or QR codes. In at least one embodiment, each genAI task includes a task-specific prompt generated using predefined prompt segments or templates defining formatting rules, stylistic constraints, permissible content elements, and validation requirements. In at least one embodiment, the director 320 specifies dependencies between genAI tasks such that certain content elements are generated before other content elements. The genAI tasks may be represented in a structured, machine-readable format to enable reliable routing and execution by downstream components.

At S430, a phishing attack simulation is generated using the retrieved phishing simulation template and additional information. In at least one embodiment, the phishing attack simulation is generated by one or more generative artificial intelligence (genAI) models 340-1-1, **340-1-*a*, 340-2-1, 340-2-*b*, 340-3-1, 340-3-*c* (herein referred to as 340-1, 340-2, 340-3). In at least one embodiment, the additional information includes one or more phishing attack vector parameters, delivery context information, user context information, organizational context information, and open-source intelligence (OSINT) indicators. In at least one embodiment, the additional information includes dynamically updated data usable to adapt phishing attack simulations to evolving threat conditions. In at least one embodiment, separate genAI models 340-1, 340-2, 340-3, are respectively configured for business email compromise phishing, QR code phishing, and malicious attachment phishing, such that the genAI compromised business email generator model 340-1, the genAI QR phishing generator model 340-2, and the genAI malicious attachment generator model 340-3** each generate phishing attack simulations exhibiting attack-vector-specific characteristics and current threat behavior.

At S440, the generated phishing attack simulation is stored and/or transmitted to one or more users 140 for execution, thereby initiating delivery of the phishing attack simulation without exposing the users 140 to actual malicious content. In at least one embodiment, execution of the generated phishing attack simulation is performed autonomously via an electronic communication environment.

Although not illustrated as a discrete step in FIG. 4, interactions with the generated phishing attack simulations are captured and monitored by the system 110. Such interactions include, for example, opening a simulated business email compromise message, scanning a simulated QR code, or opening a simulated malicious attachment. In at least one embodiment, captured interaction data is analyzed to refine subsequent phishing attack simulations, update user risk profiles, and improve the accuracy and sophistication of future phishing attack simulations. Additionally, in at least one embodiment, an interaction verification module and/or a rule engine determines whether interactions were performed by a human user or by an automated scanning activity based on one or more network characteristics, timing patterns, and behavioral signals.

Although FIG. 4 shows example blocks of the method 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
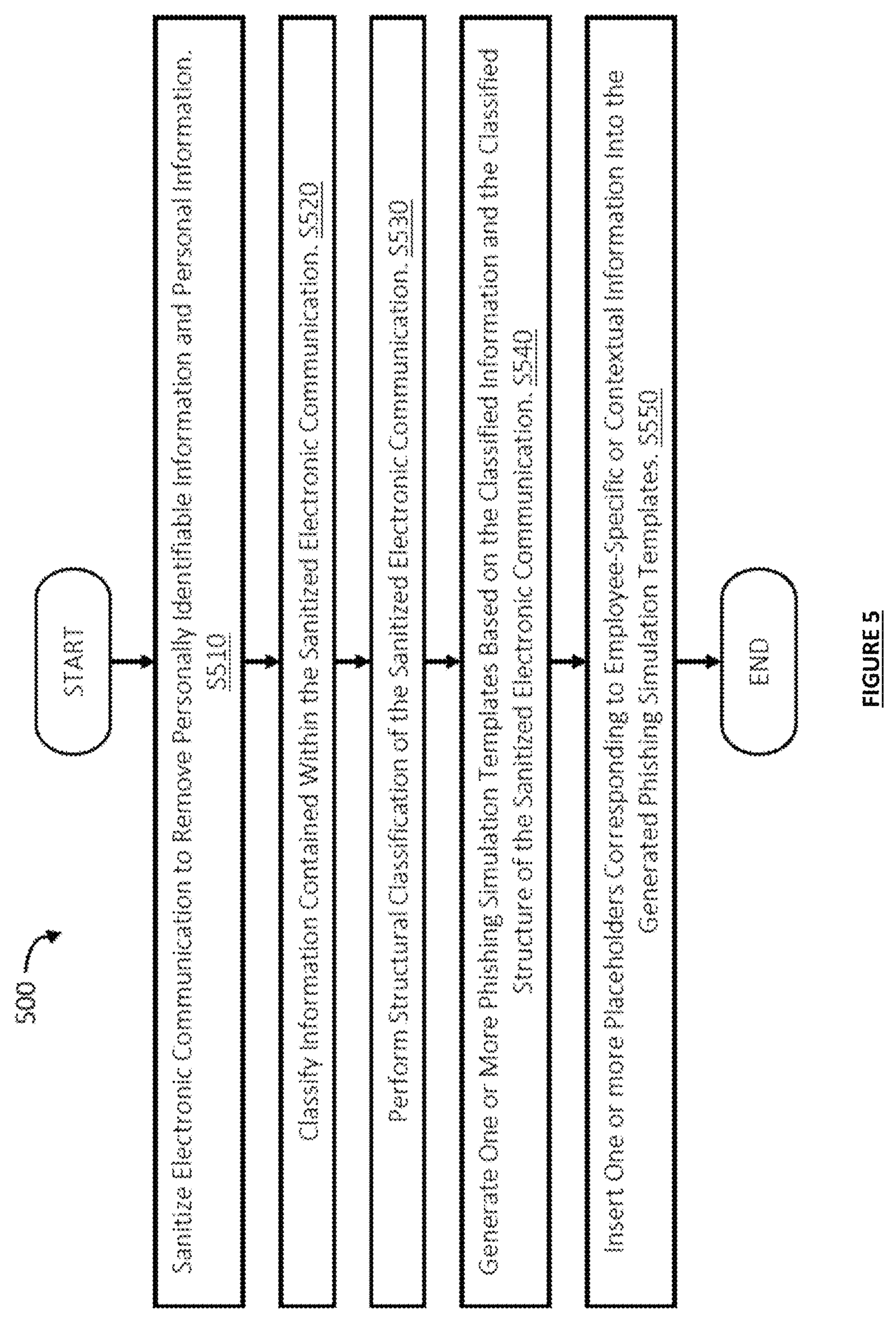
FIG. 5 is an operational flowchart illustrating a phishing simulation template generation process according to at least one embodiment.

FIG. 5 is an operational flowchart diagram illustrating a method 500, also referred to as process 500, for generating phishing simulation templates according to at least one embodiment. In some embodiments, the method 500 may be performed by a system, such as phishing attack simulation system 110 illustrated in FIGS. 1 and 2. The method 500 is executed to generate a plurality of phishing simulation templates for use in process 400. The method 500 is described with reference to the elements shown in FIGS. 1, 2, 3, and 4.

At S510, an electronic communication is sanitized to remove personally identifiable information (PII) and personal information. In at least one embodiment, the electronic communication includes an electronic mail (EML) file. In at least one embodiment, the electronic communication is automatically retrieved from, or received via, one or more data sources 130 by the template generator engine 325.

At S520, information contained within the sanitized electronic communication is classified. In at least one embodiment, the information is classified by analyzing the sanitized electronic communication's semantic and contextual features. In at least one embodiment, the classification includes parsing textual content to identify and label entity identifiers, organizational references, content categories, and contextual indicators relevant to phishing attack simulations. Such analysis may include identifying referenced services or organizations, inferred sender or recipient roles, transaction or notification intent, and language patterns commonly associated with phishing scenarios. The classified information may be normalized into a structured representation and, in at least one embodiment, correlated with external intelligence indicators, including open-source intelligence, to enhance realism, relevance, and alignment with current phishing tactics, techniques, and procedures.

At S530, a structural classification of the sanitized electronic communication is performed. In at least one embodiment, the structural classification is performed by analyzing layout, formatting, and presentation characteristics associated with the sanitized electronic communication. In at least one embodiment, the structural classification includes inspecting one or more cascading style sheet (CSS) elements, markup tags, document object model (DOM) structures, or equivalent structural representations to identify visual and layout features, including header placement, font styles, color schemes, button or link elements, image positioning, and spacing. The resulting structural classification produces a structured representation of visual and presentation attributes usable to generate phishing simulation templates that preserve the look and feel of the original electronic communication while enabling controlled variation of content.

At S540, one or more phishing simulation templates are generated based on the classified information and the classified structure of the sanitized electronic communication. In at least one embodiment, the template generator engine 325 includes one or more generative artificial intelligence models, such as large language models (LLMs), configured to generate a plurality of phishing simulation template variants from a common source representation. In at least one embodiment, template generation incorporates one or more open-source intelligence (OSINT) indicators representative of current phishing tactics, techniques, and procedures, thereby enabling generation of up-to-date template variants exhibiting attack-vector-specific characteristics. In at least one embodiment, the template generator engine 325 generates, for a selected phishing attack vector, a template-generation prompt that includes a scenario description, for example: "Create a phishing email for the IT department about a security update."

At S550, one or more placeholders corresponding to employee-specific or contextual information are inserted by the template generator engine 325 into the generated phishing simulation templates, thereby producing multiple variations of phishing simulation templates. As previously described above, the generated phishing simulation templates are subsequently used to generate and execute phishing attack simulations that are up to date, more accurate, and more sophisticated. In at least one embodiment, the phishing simulation templates are stored in the template data source 130-4 together with associated metadata.

Figure 7:
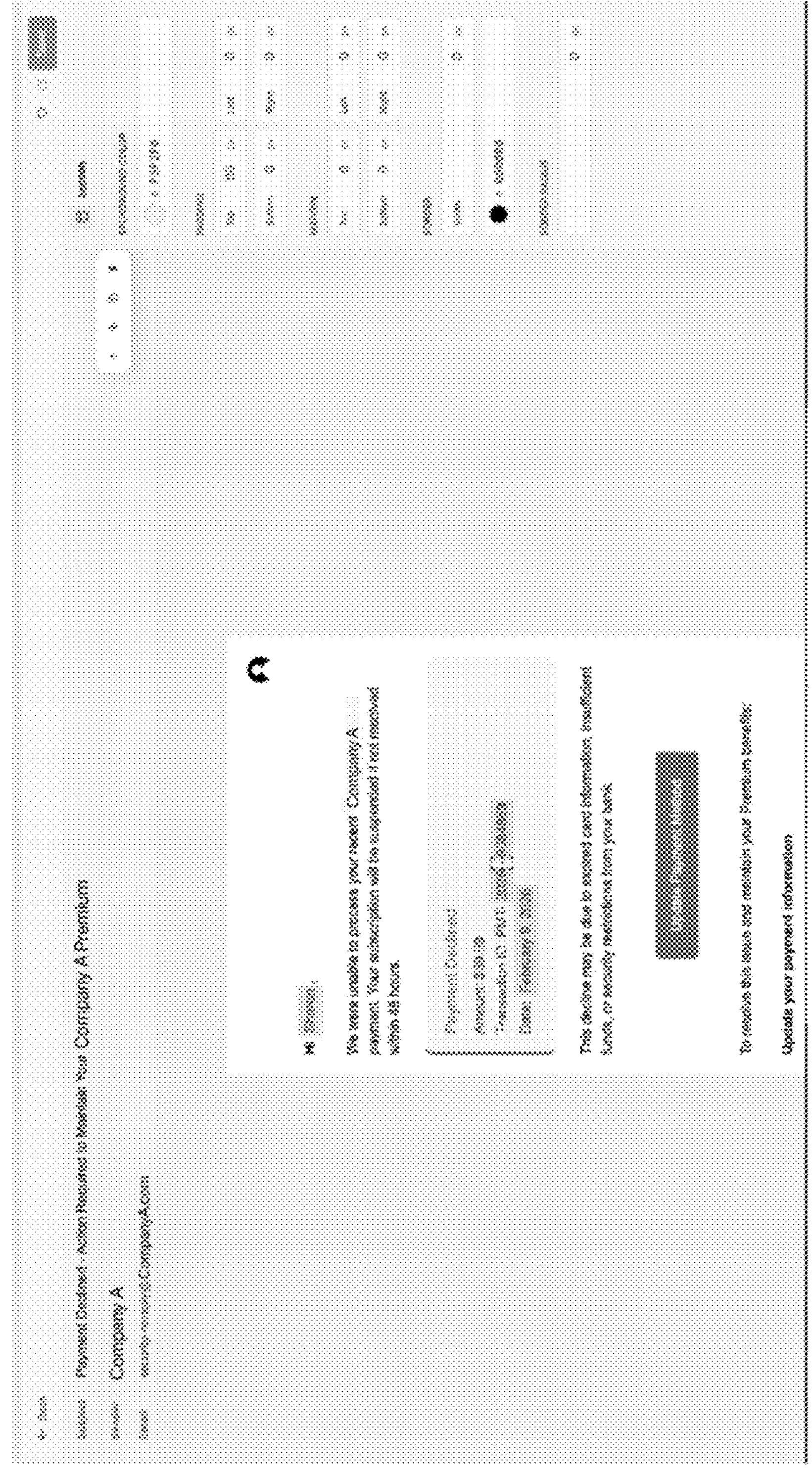
FIG. 7 illustrates an example screenshot of a template editing user interface for modifying phishing simulation templates prior to execution according to at least one embodiment.

In at least one embodiment, a template editing user interface enabling an authorized user to view, edit, and approve a phishing simulation template prior to execution is provided. As shown in FIG. 7, an example screenshot 700 of the user interface presents message header fields (e.g., subject, sender display name, sender address, recipient-related fields) and a template preview region displaying the rendered phishing simulation content. The user interface further provides editing controls enabling modification of one or more template parameters, including recipient-specific fields and placeholder values (e.g., names, transaction identifiers, dates), as well as layout and presentation attributes associated with template sections. In at least one embodiment, properties panel enables editing of formatting attributes, including background color, padding, margin, border properties, and border radius for a selected template section, while preserving a parameterized template representation usable for automated variation generation and policy enforcement. In at least one embodiment, upon user approval, the edited template is stored to the template data source 130-4 and/or is made available for retrieval by the reasoning model director 320 for subsequent phishing attack simulation generation and execution.

Figure 8:
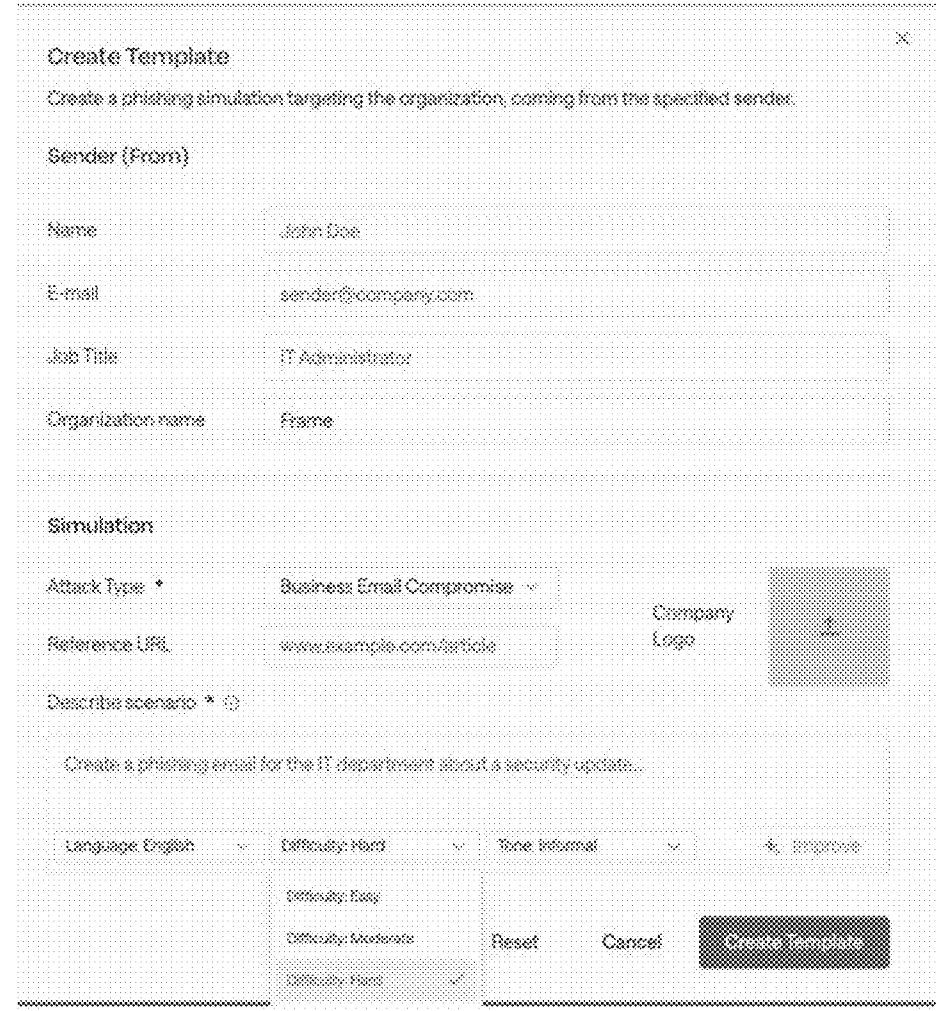
FIG. 8 illustrates an example screenshot of a difficulty calibration user interface for generating phishing simulation templates with varying difficulty levels according to a phishing indicator scale according to at least one embodiment.

In at least one embodiment, a template creation user interface configured to receive scenario inputs and to generate phishing simulation templates having a selected difficulty level is provided. As illustrated in FIG. 8, a screenshot 800 of the user interface enables entry of sender-related parameters (e.g., sender name, sender address, job title, organization name) and simulation parameters, including a selected phishing attack vector (e.g., business email compromise), an optional reference URL corresponding to external intelligence or source material, and a natural-language scenario description. The user interface further includes selectable generation controls, including language selection, tone selection, and a difficulty selection control. In at least one embodiment, the difficulty selection control corresponds to a phishing indicator scale aligned with recognized phishing assessment frameworks, including a NIST-aligned phishing scale, such that each difficulty level (e.g., easy, moderate, hard) is mapped to a respective combination of phishing indicators and/or an indicator weighting profile.

In response to user selection of a difficulty level, the template generator engine 325 and/or one or more genAI models generate or regenerate one or more phishing simulation templates that satisfy the selected difficulty by selectively introducing, suppressing, or modifying phishing indicators, including one or more of generic greetings, urgency language, sender-domain inconsistencies, typographical anomalies, suspicious link structures, or call-to-action patterns, while maintaining realism and compliance with organizational constraints. The generated phishing simulation template may be stored in the template data source 130-4 together with difficulty metadata and identified phishing indicators to support subsequent automated retrieval, ranking, and execution.

In at least one embodiment, a phishing attack simulation including a message that simulates an urgent account security notification is generated. As illustrated in FIG. 9A, a screenshot 900A of a generated phishing attack simulation includes one or more phishing indicators, including urgency language (e.g., "URGENT", "immediately", short compliance deadlines), a sender identity that appears plausible while using a non-authoritative domain, and a call-to-action link directing a user to perform an account-related action. In at least one embodiment, the link directs the user to a controlled simulation endpoint configured to record interaction events, including message opens, link selections, and subsequent interactions on the controlled endpoint, without exposing the user to actual malicious content. In at least one embodiment, structured phishing indicator data is associated with the generated phishing attack simulation for use in user feedback and remediation.

In at least one embodiment, a phishing attack simulation including a message that simulates an organizational administrative workflow, including benefits enrollment or human resources communications, is generated. As illustrated in FIG. 9B, a screenshot 900B of a generated phishing attack simulation includes a deadline-driven call-to-action and content designed to resemble legitimate organizational notices, including time-sensitive enrollment language and instructions to access a portal via an embedded link. In at least one embodiment, the message content is generated using a phishing simulation template and additional contextual information. In at least one embodiment, the generated phishing attack simulation is evaluated according to a phishing indicator scale to identify phishing indicators, generate structured explanation data, and optionally assign a difficulty level. The generated phishing attack simulation is transmitted via an electronic communication environment and includes tracking elements configured to capture and verify interaction events while suppressing automated scanning activity.

In at least one embodiment, the phishing indicators identified in connection with FIGS. 9A and 9B are used to compute or assign a difficulty level according to a phishing indicator scale, and the difficulty level is used to generate template variants having different combinations of phishing indicators.

Although FIG. 5 shows example blocks of the method 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is an example block diagram of a computing architecture of the phishing attack simulation system 110 according to an embodiment.

The phishing attack simulation system 110 includes a processing circuitry 610 coupled to a memory 620, a storage 630, and a network interface 640. In an embodiment, the components may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), graphics processing units (GPUs), system-on-a-chip systems (SOCs), general-purpose microprocessors, microcontrollers, digital signal processors (DSPs), and the like, or any other hardware logic components that can perform calculations or other manipulations of information.

In at least some embodiments, the processing circuitry 610 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 610 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In embodiments that utilize language models or otherwise perform operations that may require or be enhanced through the use of parallel processing, the processing circuitry 610 may include processors such as CPUs, GPUs, TPUs, or other specialized accelerators capable of supporting large-scale model inference and training. The hardware resources may be deployed on-premises, in a cloud-computing environment, or in a hybrid configuration, and may include memory, storage, and networking components sufficient to support parallel execution, load balancing, and scalable processing of genAI workloads.

The memory 620 may be volatile (e.g., RAM, etc.), non-volatile (e.g., ROM, flash memory, etc.), or any combination thereof. In one configuration, computer-readable instructions needed to implement one or more embodiments disclosed herein may be stored in the storage 630.

In another embodiment, the memory 620 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 610 to perform the various processes described herein.

The storage 630 may be magnetic storage, optical storage, and the like, and may be realized, for example, as flash memory or other memory technology, CD-ROM, Digital Versatile Disks (DVDs), hard drives, SSD, or any other medium which can be used to store the desired information, such as log of transactions, public keys, and so on. The storage 630 may include code for generating and executing phishing attack simulations.

The network interface 640 allows the phishing attack simulation system 110 to communicate with the Internet or a local area network. The network interface 640 communicates with these elements.

It should be understood that the embodiments described herein are not limited to the specific architecture illustrated in FIG. 6 and that other architectures may be equally used without departing from the scope of the disclosed embodiments.

It should be further noted that the phishing attack simulation system 110 may be realized using a computing architecture similar to the architecture illustrated in FIG. 6, but that other architectures may be equally used without departing from the scope of the disclosed embodiments. Further, the memory 620 may include instructions for executing the function of the respective device.

The various embodiments disclosed herein can be implemented as hardware, firmware, firmware executing on hardware, software, software executing on hardware, or any combination thereof. Moreover, the software is preferably implemented as an application program tangibly embodied on a program storage unit or computer-readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a micro-instruction code. The various processes and functions described herein may be either part of the micro-instruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the groups consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for automated generation and execution of phishing attack simulations, comprising:

generating an enriched prompt corresponding to a selected phishing attack vector based on a user request to generate a phishing attack simulation and either evolving cyber threat behavior or organizational policies, wherein the user request comprises a natural language phishing scenario description, further comprising:

mapping the natural language phishing scenario description to a predefined phishing tactic taxonomy; and gathering contextual information based on the predefined phishing tactic taxonomy to tailor the phishing attack simulation;

prompting, by a reasoning model, the generated enriched prompt to retrieve a phishing simulation template corresponding to the selected phishing attack vector;

generating the phishing attack simulation by one or more generative artificial intelligence (genAI) models using the retrieved phishing simulation template and additional information; and executing the generated phishing attack simulation by transmitting the phishing attack simulation to one or more users via an electronic communication environment.

2. The method of claim 1, further comprising:

capturing interaction data associated with the phishing attack simulation;

analyzing the captured interaction data;

updating a user risk profile based on the analyzed captured interaction data; and selecting subsequent phishing attack simulations based on the user risk profile.

3. The method of claim 1, wherein the selected phishing attack vector comprises one of business email compromise phishing, QR code phishing, or malicious attachment phishing.

4. The method of claim 1, wherein the one or more genAI models comprise separate genAI models respectively configured for business email phishing, QR code phishing, and malicious attachment phishing.

5. The method of claim 1, wherein the additional information comprises one or more of phishing attack vector parameters, delivery context information, organizational context information, user context information, and open-source intelligence (OSINT) indicators, wherein the OSINT indicators are representative of current phishing tactics, techniques, and procedures.

6. The method of claim 1, further comprising:

generating the phishing simulation template from a legitimate electronic communication associated with at least one software-as-a-service (SaaS) provider.

7. The method of claim 6, wherein generating the phishing simulation template comprises analyzing visual structure, formatting attributes, and linguistic patterns of the legitimate electronic communication.

8. The method of claim 6, further comprising:

generating a plurality of phishing simulation template variants corresponding to different phishing scenarios associated with the SaaS provider.

9. The method of claim 1, further comprising:

evaluating the generated phishing attack simulation according to a phishing indicator scale, wherein evaluating further comprises identifying phishing indicators and generating structured explanation data associated with the generated phishing attack simulation.

10. The method of claim 2, further comprising:

distinguishing human user interactions from automated scanning activity by evaluating one or more of network characteristics, access timing, and interaction behavior.

11. The method of claim 1, wherein executing the generated attack simulation comprises injecting the generated phishing attack simulation directly into a user mailbox via an application programming interface.

12. The method of claim 8, wherein the generated phishing simulation templates and the generated variants are periodically updated to reflect current cyber threats, attack techniques, and emerging security trends.

13. The method of claim 2, further comprising:

providing user feedback identifying one or more phishing indicators associated with the executed generated phishing attack simulation; and assigning one or more remediation actions based on the analyzed captured interaction behavior.

14. A system for automated generation and execution of phishing attack simulations comprising:

one or more processors configured to:

generate an enriched prompt corresponding to a selected phishing attack vector based on a user request to generate a phishing attack simulation and either evolving cyber threat behavior or organizational policies, wherein the user request comprises a natural language phishing scenario description, further comprising:

mapping the natural language phishing scenario description to a predefined phishing tactic taxonomy; and gathering contextual information based on the predefined phishing tactic taxonomy to tailor the phishing attack simulation;

prompt, by a reasoning model, the generated enriched prompt to retrieve a phishing simulation template corresponding to the selected phishing attack vector generate the phishing attack simulation by one or more generative artificial intelligence (genAI) models using the retrieved phishing simulation template and additional information; and execute the generated phishing attack simulation by transmitting the phishing attack simulation to one or more users via an electronic communication environment.

15. The system of claim 14, wherein the one or more processors are further configured to:

capture interaction data associated with the phishing attack simulation;

analyze the captured interaction data;

update a user risk profile based on the analyzed captured interaction data; and select subsequent phishing attack simulations based on the user risk profile.

16. The system of claim 15, wherein the one or more processors are further configured to:

distinguish human user interactions from automated scanning activity by evaluating one or more of network characteristics, access timing, and interaction behavior.

17. The system of claim 15, wherein the one or more processors are further configured to:

provide user feedback identifying one or more phishing indicators associated with the executed generated phishing attack simulation; and assign one or more remediation actions based on the analyzed captured interaction behavior.

18. The system of claim 14, wherein the one or more processors, when the selected phishing attack vector, are configured to one of business email compromise phish, QR code phishing, or malicious attachment phishing.

19. The system of claim 14, wherein the one or more genAI models comprise separate genAI models respectively configured for business email phishing, QR code phishing, and malicious attachment phishing.

20. The system of claim 14, wherein the additional information comprises one or more of phishing attack vector parameters, delivery context information, organizational context information, user context information, and open-source intelligence (OSINT) indicators, wherein the OSINT indicators are representative of current phishing tactics, techniques, and procedures.

21. The system of claim 14, wherein the one or more processors are further configured to:

generate the phishing simulation template from a legitimate electronic communication associated with at least one software-as-a-service (SaaS) provider.

22. The system of claim 21, wherein the one or more processors, when generating the phishing simulation template, are configured to analyze visual structure, formatting attributes, and linguistic patterns of the legitimate electronic communication.

23. The system of claim 21, wherein the one or more processors are further configured to:

generate a plurality of phishing simulation template variants corresponding to different phishing scenarios associated with the SaaS provider.

24. The system of claim 23, wherein the generated phishing simulation templates and the generated variants are periodically updated to reflect current cyber threats, attack techniques, and emerging security trends.

25. The system of claim 14, wherein the one or more processors are further configured to:

evaluate the generated phishing attack simulation according to a phishing indicator scale, wherein evaluating further comprises identifying phishing indicators and generating structured explanation data associated with the generated phishing attack simulation.

26. The system of claim 14, wherein the one or more processors, when executing the generated attack simulation, are configured to inject the generated phishing attack simulation directly into a user mailbox via an application programming interface.

27. A non-transitory computer-readable medium storing a set of instructions for automated generation and execution of phishing attack simulations, the set of instructions comprising:

one or more instructions that, when executed by one or more processors of a device, cause the device to:

generate an enriched prompt corresponding to a selected phishing attack vector based on a user request to generate a phishing attack simulation and either evolving cyber threat behavior or organizational policies, wherein the user request comprises a natural language phishing scenario description, further comprising:

mapping the natural language phishing scenario description to a predefined phishing tactic taxonomy; and gathering contextual information based on the predefined phishing tactic taxonomy to tailor the phishing attack simulation;

prompt, by a reasoning model, the generated enriched prompt to retrieve a phishing simulation template corresponding to the selected phishing attack vector;

generate the phishing attack simulation by one or more generative artificial intelligence (genAI) models using the retrieved phishing simulation template and additional information; and execute the generated phishing attack simulation by transmitting the phishing attack simulation to one or more users via an electronic communication environment.

* * * * *